(12) United States Patent
Itoi et al.

(10) Patent No.: US 7,391,811 B2
(45) Date of Patent: Jun. 24, 2008

(54) STEREOSCOPIC IMAGE ENCODING AND DECODING DEVICE MULTIPLEXING HIGH RESOLUTION ADDED IMAGES

(75) Inventors: Satoshi Itoi, Tokyo (JP); Nobuaki Takanashi, Tokyo (JP)

(73) Assignee: NEC Corporation, Tokyo (JP)

( * ) Notice: Subject to any disclaimer, the term of this patent is extended or adjusted under 35 U.S.C. 154(b) by 768 days.

(21) Appl. No.: 10/615,229

(22) Filed: Jul. 9, 2003

(65) Prior Publication Data

US 2004/0008893 A1    Jan. 15, 2004

(30) Foreign Application Priority Data

Jul. 10, 2002    (JP) .............................. 2002-201797

(51) Int. Cl.
*H04N 7/12* (2006.01)
(52) U.S. Cl. .................................. 375/240.26
(58) Field of Classification Search ............ 375/240.26, 375/240.03; 348/48; *H04N 7/12*
See application file for complete search history.

(56) References Cited

U.S. PATENT DOCUMENTS 6,055,012 A * 4/2000 Haskell et al. ................ 348/48

FOREIGN PATENT DOCUMENTS

JP        7-123447 A    5/1995
JP       11-18111 A    1/1999

* cited by examiner

*Primary Examiner*—Young Lee
(74) *Attorney, Agent, or Firm*—Sughrue Mion, PLLC

(57) ABSTRACT

A left-eye image signal and a right-eye image signal are supplied to a pixel structure converter of a stereoscopic image pre-processor, and multiplexed, so to form one image, an interlace image is formed by a frame/field converter, encoded in an MPEG format by an MPEG encoding unit, stored into a storage and transmitted outward by a transmitting/recording unit. The encoded stereoscopic image signal received from the outward and reproduced from the storage is decoded by am MPEG decoding unit after going through a receiving/reproducing unit, the interlace image is reproduced, returned to the frame image by a field/frame converter of a stereoscopic image post-processor, and reproduced as the left-eye image signal and the right-eye image signal and output by the pixel structure converter.

5 Claims, 17 Drawing Sheets

FIG 10

| | | | | | | | |
|---|---|---|---|---|---|---|---|
| X00 | 0 | X01 | 0 | X02 | 0 | X03 | 0 |
| X10 | 0 | X11 | 0 | X12 | 0 | X13 | 0 |
| X20 | 0 | X21 | 0 | X22 | 0 | X23 | 0 |
| X30 | 0 | X31 | 0 | X32 | 0 | X33 | 0 |
| X40 | 0 | X41 | 0 | X42 | 0 | X43 | 0 |
| X50 | 0 | X51 | 0 | X52 | 0 | X53 | 0 |
| X60 | 0 | X61 | 0 | X62 | 0 | X63 | 0 |
| X70 | 0 | X71 | 0 | X72 | 0 | X73 | 0 |

| | | | | | | | |
|---|---|---|---|---|---|---|---|
| X00 | X00 | X01 | X01 | X02 | X02 | X03 | X03 |
| X10 | X10 | X11 | X11 | X12 | X12 | X13 | X13 |
| X20 | X20 | X21 | X21 | X22 | X22 | X23 | X23 |
| X30 | X30 | X31 | X31 | X32 | X32 | X33 | X33 |
| X40 | X40 | X41 | X41 | X42 | X42 | X43 | X43 |
| X50 | X50 | X51 | X51 | X52 | X52 | X53 | X53 |
| X60 | X60 | X61 | X61 | X62 | X62 | X63 | X63 |
| X70 | X70 | X71 | X71 | X72 | X72 | X73 | X73 |

| | | | | | | | |
|---|---|---|---|---|---|---|---|
| X00 | (X00+X01)/2 | X01 | (X01+X02)/2 | X02 | (X02+X03)/2 | X03 | 0 |
| X10 | (X10+X11)/2 | X11 | (X11+X12)/2 | X12 | (X12+X13)/2 | X13 | 0 |
| X20 | (X20+X21)/2 | X21 | (X21+X22)/2 | X22 | (X22+X23)/2 | X23 | 0 |
| X30 | (X30+X31)/2 | X31 | (X31+X32)/2 | X32 | (X32+X33)/2 | X33 | 0 |
| X40 | (X40+X41)/2 | X41 | (X41+X42)/2 | X42 | (X42+X43)/2 | X43 | 0 |
| X50 | (X50+X51)/2 | X51 | (X51+X52)/2 | X52 | (X52+X53)/2 | X53 | 0 |
| X60 | (X60+X61)/2 | X61 | (X61+X62)/2 | X62 | (X62+X63)/2 | X63 | 0 |
| X70 | (X70+X71)/2 | X71 | (X71+X72)/2 | X72 | (X72+X73)/2 | X73 | 0 |

| | | | | | | | |
|---|---|---|---|---|---|---|---|
|X00|(X00+X01)/2|X01|(X01+X02)/2|X02|(X02+X03)/2|X03|X03|
|X10|(X10+X11)/2|X11|(X11+X12)/2|X12|(X12+X13)/2|X13|X13|
|X20|(X20+X21)/2|X21|(X21+X22)/2|X22|(X22+X23)/2|X23|X23|
|X30|(X30+X31)/2|X31|(X31+X32)/2|X32|(X32+X33)/2|X33|X33|
|X40|(X40+X41)/2|X41|(X41+X42)/2|X42|(X42+X43)/2|X43|X43|
|X50|(X50+X51)/2|X51|(X51+X52)/2|X52|(X52+X53)/2|X53|X53|
|X60|(X60+X61)/2|X61|(X61+X62)/2|X62|(X62+X63)/2|X63|X63|
|X70|(X70+X71)/2|X71|(X71+X72)/2|X72|(X72+X73)/2|X73|X73|

STEREOSCOPIC IMAGE ENCODING AND DECODING DEVICE MULTIPLEXING HIGH RESOLUTION ADDED IMAGES

BACKGROUND OF THE INVENTION

1. Field of the Invention

The present invention relates to a stereoscopic image encoding device for efficiently encoding and transmitting image data including a stereoscopic image, a stereoscopic image and plane image, a stereoscopic image and high resolution plane image, and a stereoscopic image and high resolution added image, and a stereoscopic image decoding device for efficiently receiving and decoding the image data.

2. Description of the Related Art

As the conventional encoding method of a stereoscopic image signal, patented is, for example, "Stereoscopic Video Image Transmission Method and System" disclosed in Japanese Patent Laid-Open (kokai) No. Heisei 11-018111.

The constitutional example of this invention is shown in FIG. 20.

A stereoscopic image 2001 is formed by left-eye images (○) 2002 and right-eye images (X) 2003. They are disposed on a display as shown by 2001. Namely, left-eye images and right-eye images are aligned alternatively in every other vertical line. The example of FIG. 20 shows the sum of 352 pixels×288 lines including the left-eye images of 176 pixels× 288 lines and the right-eye images of 176 pixels×288 lines.

The stereoscopic image 2001 is converted into a conversion image 2004. Namely, on the screen of 352 pixels×288 lines, the left-eye images of 176 pixels×288 lines are disposed at the left half and the right-eye images of 176 pixels×288 lines are disposed at the right half.

Then, as for the conversion image shown by 2004, the processing including MPEG encoding 2005, transmitting/recording 2006, receiving/reproducing 2007, and MPEG decoding 2008 will be performed.

The output image signal from the processing of the MPEG decoding 2008 reproduces the same stereoscopic image 2009 as the input signal of the stereoscopic image 2001.

The conventional technique, however, has the following defects.

Since the left-eye images are disposed at the left half and the right-eye images are disposed at the right half in the signal of the conversion image 2004, correlativity between the left-eye image and the right-eye image cannot be applied in the MPEG encoding. Namely, in the stereoscopic image, a nearby object is the data with the left-eye image distant from the right-eye image and a distant object is the data with the left-eye image approximate to the right-eye image, and especially, in a block indicating a distant object, efficiency of the data encoding can be improved by using the correlativity between the left-eye image and the right-eye image. In the conventional encoding method, however, it cannot be realized.

When displaying a stereoscopic image after encoding and transmitting the same on a stereoscopic image display, it is necessary to have a consideration to display the same signal simultaneously on a display for high resolution plane image. Namely, it is important to efficiently encode and transmit the image data formed by not only the stereoscopic image but also the stereoscopic image and high resolution plane added image. The conventional example, however, has never considered this.

SUMMARY OF THE INVENTION

An object of the invention is to provide a stereoscopic image encoding and decoding device capable of efficiently encoding and transferring the image data formed by not only a stereoscopic image but also a stereoscopic image and high resolution plane image.

According to the first aspect of the invention, a stereoscopic image encoding and decoding device, comprises a stereoscopic image encoding device and a stereoscopic image decoding device, wherein the stereoscopic image encoding device includes a stereoscopic image pre-processor for multiplexing left-eye images and right-eye images and forming one image, and an image encoding unit for encoding the one image processed by the stereoscopic image pre-processor, while the stereoscopic image decoding device includes an image decoding unit for decoding the one image encoded by the image encoding unit, and a stereoscopic image post-processor for separating the one image decoded by the image decoding unit into the left-eye images and the right-eye images.

In the preferred construction, the left-eye images are arranged in odd lines and the right-eye images are arranged in even lines, or the right-eye images are arranged in the odd lines and the left-eye images are arranged in the even lines, so to form one image as an interlace image, when an optimum block is selected, from the block formed by the data in the odd lines and the even lines and the block formed by the data only in the odd lines or only in the even lines, and further, an optimum prediction method is selected, from frame prediction from forward and backward frames or field prediction from forward and backward fields, an error between the predicted block data and the block data is orthogonally transformed, quantized, and variable-length encoded, and as a result, the block and the prediction method having the minimum code amount of the block data are selected.

According to the second aspect of the invention, a stereoscopic image encoding and decoding device comprises a stereoscopic image encoding device and a stereoscopic image decoding device, wherein the stereoscopic image encoding device includes a stereoscopic image pre-processor for multiplexing left-eye images, right-eye images, and high resolution added images for turning the left-eye images or the right-eye images to the images of high resolution and forming one image, and an image encoding unit for encoding the one image processed by the stereoscopic image pre-processor, while the stereoscopic image decoding device includes an image decoding unit for decoding the one image encoded by the image encoding unit, and a stereoscopic image post-processor for separating the one image decoded by the image decoding unit into the left-eye images, the right-eye images, and the high resolution added images for turning the left-eye images or the right-eye images to the images of high resolution.

In the preferred construction, ones of the left-eye images, the right-eye images, and the high resolution added images are arranged in a left ⅓ portion of one image, the other ones are arranged in a middle portion of the one image, and further the other ones are arranged in a right ⅓ portion of the one image.

In another preferred construction, ones of the left-eye images, the right-eye images, and the high resolution added images are arranged in a top ⅓ portion of one image, the other ones are arranged in a middle portion of the one image, and further the other ones are arranged in a bottom ⅓ portion of the one image.

In another preferred construction, when the high resolution plane images are the left-eye images, ones of the right-eye images and the high resolution plane images formed by the left-eye images and the high resolution added images for turning the left-eye images to the high resolution images, are arranged in the left ⅓ to ⅔ portion of one image and the other ones are arranged in the right ⅓ to ⅔ portion of the one image, when the high resolution plane images are the right-eye images, ones of the left-eye images and the high resolution plane images formed by the right-eye images and the high resolution added images for turning the right-eye images to the high resolution images, are arranged in the left ⅓ to ⅔ portion of one image and the other ones are arranged in the right ⅓ to ⅔ portion of the one image.

According to another aspect of the invention, a stereoscopic image encoding and decoding device, comprises a stereoscopic image encoding device and a stereoscopic image decoding device, wherein the stereoscopic image encoding device multiplexes the left-eye images and the high resolution added images for turning the left-eye images to the high resolution images so to form one first image, and multiplexes the right-eye images and dummy images so to form one second image, when the high resolution plane images are the left-eye images, multiplexes the right-eye images and the high resolution added images for turning the right-eye images to the high resolution images so to form one first image, and multiplexes the left-eye images and the dummy images so to form one second image, when the high resolution plane images are the right-eye images, and further a stereoscopic image pre-processor for combining the first image with the second image to form one third image, and an image encoding unit for encoding the one third image processed by the stereoscopic image pre-processor, are provided, while the stereoscopic image decoding device includes an image decoding unit for decoding the one third image encoded by the image encoding unit, and a stereoscopic image post-processor for separating the one third image decoded by the image decoding unit into one first image consisting of the left-eye images and the high resolution added images and one second image consisting of the right-eye images and the dummy images, further separating the one first image into the left-eye images and the high resolution added images, and separating the one second image into the right-eye images, when the high resolution images are the left-eye images, and for separating the one third image decoded by the image decoding unit into one first image consisting of the right-eye images and the high resolution added images and one second image consisting of the left-eye images and the dummy images, separating the one first image into the right-eye images and the high resolution added images, and further separating the one second image into the left-eye images, when the high resolution images are the right-eye images.

In the preferred construction, the first image is arranged in the odd lines and the second image is arranged in the even lines, or the second image is arranged in the odd lines and the first image is arranged in the even lines, and the third image is defined as an interlace image, and the dummy image is defined as "0" data.

In another preferred construction, the first image is arranged in the odd lines and the second image is arranged in the even lines, or the second image is arranged in the odd lines and the first image is arranged in the even lines, and the third image is defined as an interlace image, and the dummy image is set at the same value as pixel data at a left side or pixel data at a right side.

In another preferred construction, the first image is arranged in the odd lines and the second image is arranged in the even lines, or the second image is arranged in the odd lines and the first image is arranged in the even lines, and the third image is defined as an interlace image, and the dummy image is set at the average value of the pixel data at the left and the pixel data at the right.

In another preferred construction, the dummy image in a leftmost column on a screen or in a rightmost column is defined as "0" data.

In another preferred construction, the dummy image in the leftmost column on the screen is set at the same value as the right pixel data thereof, or the dummy image in the rightmost column on the screen is set at the same value as the left pixel data thereof.

In another preferred construction, ones of the left-eye images, the right-eye images, and the high resolution added images, are arranged in two of the odd lines of the (3n+1)th frame (n is an integer of 0 and more), the even lines of the (3n+1)th frame, the odd lines of the (3n+2)th frame, the even lines of the (3n+2)th frame, the odd lines of the (3n+3)th frame, and the even lines of the (3n+3)th frame, the other ones are arranged in the other two of the odd lines of the (3n+1)th frame, the even lines of the (3n+1)th frame, the odd lines of the (3n+2)th frame, the even lines of the (3n+2)th frame, the odd lines of the (3n+3)th frame, and the even lines of the (3n+3)th frame, further the other ones are arranged in further the other two of the odd lines of the (3n+1)th frame, the even lines of the (3n+1)th frame, the odd lines of the (3n+2)th frame, the even lines of the (3n+2)th frame, the odd lines of the (3n+3)th frame, and the even lines of the (3n+3)th frame, and the images arranged in the odd lines and the even lines of the same frame are defined as interlace images.

In another preferred construction, ones of the left-eye images, the right-eye images, and the high resolution added images are arranged in the odd lines of the (3n+1)th frame and the even lines of the (3n+2)th frame (n is an integer of 0 and more), the other ones are arranged in the even lines of the (3n+1)th frame and the odd lines of the (3n+3)th frame, and further the other ones are arranged in the odd lines of the (3n+2)th frame and the even lines of the (3n+3)th frame, and the images arranged in the odd lines and the images arranged in the even lines of the same frame are defined as interlace images.

According to another aspect of the invention, a stereoscopic image encoding and decoding device, in which a flag identifying a stereoscopic image stream is inserted into a encoded transmission and record stream, on a side of encoding, and the identification of the stereoscopic image stream is detected by detecting the flag, and decoded and post-processed as the stereoscopic image, on a side of decoding.

According to another aspect of the invention, a stereoscopic image encoding and decoding device, in which a flag indicating which image forms the stream, of only a plane image, only a stereoscopic image, a stereoscopic image and plane image, a stereoscopic image and high resolution plane image, and a stereoscopic image and high resolution plane added image, is inserted into a encoded transmission and record stream, on the side of encoding, and of only the plane image, only the stereoscopic image, the stereoscopic and plane image, the stereoscopic and high resolution plane image, and the stereoscopic image and high resolution added image, which image forms the stream is detected by detecting the flag, and the image is decoded and post-processed, according to the detected result, on a side of decoding.

According to another aspect of the invention, a stereoscopic image encoding and decoding device, in which a flag indicating a multiplexing method of all or one of a plane image, a stereoscopic image, a high resolution plane image, and a high resolution added image in the stream, is inserted into a encoded transmission and record stream, on a side of encoding, and the multiplexing method of all or one of the plane image, the stereoscopic image, the high resolution plane image, and the high resolution added image in the stream, is detected by detecting the flag, and the image is decoded and post-processed, according to the detected result, on a side of decoding.

In the preferred construction, the multiplexing method includes all or one of: whether the high resolution plane image or the high resolution added image corresponds to the left-eye images and/or the right-eye images, which data to be arranged in the odd fields and the even fields in the case of an interlace image, how to arrange continuous data, and how to construct dummy data.

In another preferred construction, MPEG (Moving Picture Expert Group) method is used as a encoding method.

In another preferred construction, MPEG method is used as a encoding method, and a difference of the left-eye image and the right-eye image is detected by every macro block; when the difference is larger than a rated value, a field DCT is applied, while when the difference is smaller than a rated value, a frame DCT is applied.

The invention has a function enabling an efficient encoding of the left-eye images, the right-eye images, and the high resolution added images, by using the respective correlation.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 10 is a view showing the state of inserting "0" into every one pixel;

FIG. 11 is a view showing the state of inserting the same value as the previous pixel (left pixel) into every one pixel;

FIG. 12 is a view showing the state of inserting the average value of the previous pixel (left pixel) and the posterior pixel (right pixel) into every one pixel;

FIG. 13 is a view showing the state of inserting the average value of the previous pixel (left pixel) and the posterior pixel (right pixel) into every one pixel;

FIG. 15 is a view showing a fourth embodiment;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Preferred embodiments of the present invention will be described with reference to FIG. 1 and FIG. 2.

The structure of the invention will be described.

Figure 1:
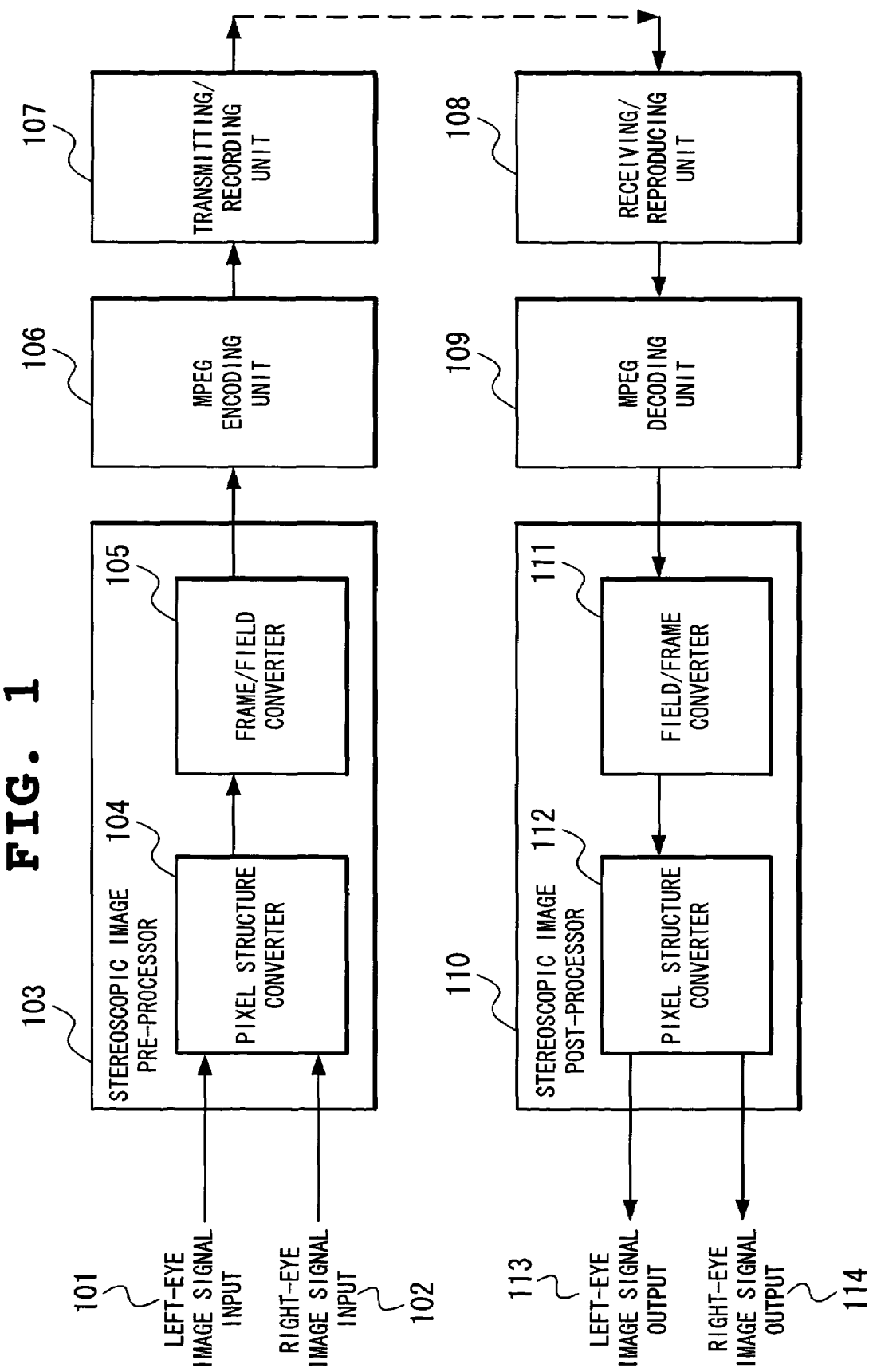
FIG. 1 is a block diagram of a first stereoscopic image encoding/decoding device realizing the invention.

FIG. 1 shows a block diagram in the case of receiving the right-eye images for the same number of pixels and the same resolution as the left-eye images, as one example of a stereoscopic image encoding/decoding device embodying the invention.

The stereoscopic image encoding/decoding device receives the left-eye image signal from 101 and the right-eye image signal from 102. They are defined as the progressive images formed by the frames. Here, when a stereoscopic image display can display 352 pixels×288 lines, the left-eye image signal 101 and the right-eye image signal 102 are respectively defined as the image signals consisting of 176 pixels×288 lines and a user can get the audiovisual images of each 176 pixels×288 lines for left-eye and right-eye.

The left-eye image signal 101 and the right-eye image signal 102 are respectively supplied to a pixel structure converter 104 of the stereoscopic image pre-processor 103. In the pixel structure converter 104, the left-eye image signal 101 and the right-eye image signal 102 are multiplexed and one image is formed, and in a frame/field converter 105, an interlace image virtually consisting of the Top Field and the Bottom Field is formed. The operations of the pixel structure converter 104 and the frame/field converter 105 within the stereoscopic image pre-processor 103 will be later described in detail. The image signal supplied from the frame/field converter 105 is encoded in an image encoding format such as MPEG-2 and MPEG-4 by an MPEG (Moving Picture Expert Group) encoding unit 106, and it is recorded into a storage and transmitted outwards, as a encoded stereoscopic image signal, by a transmitting/recording unit 107.

The encoded stereoscopic image signal received outward and reproduced from the storage, after going through the receiving/reproducing unit 108, is MPEG-decoded by an MPEG decoding unit 109, and the interlace image consisting of the Top Field and the Bottom Field is reproduced. The interlace image signal is returned to the progressive image of the frame structure by a field/frame converter 111 of a stereoscopic image post-processor 110, and it is reproduced as the left-eye image signal and the right-eye image signal by the pixel structure converter 112 and supplied as the outputs 113 and 114 respectively.

Figure 2:
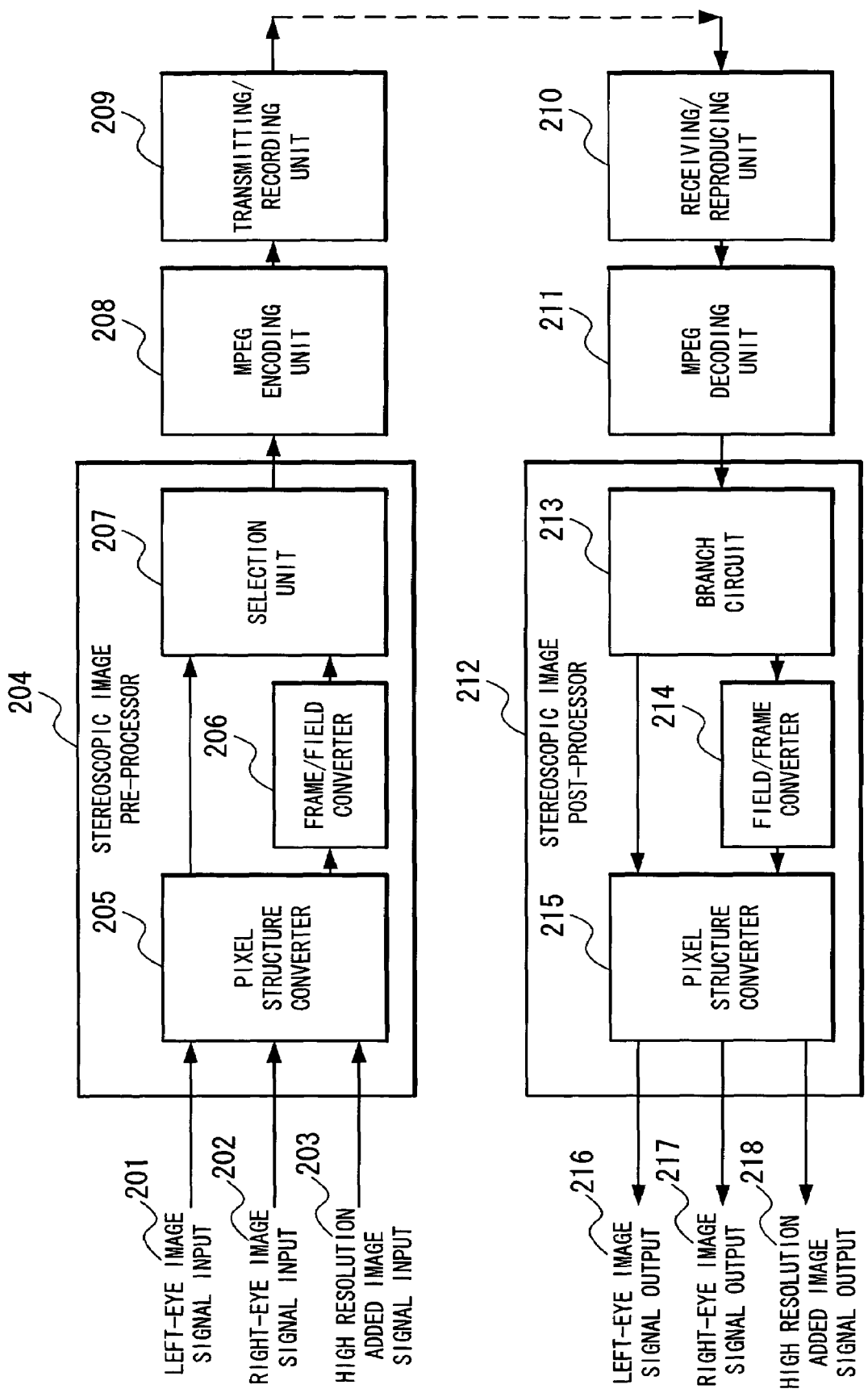
FIG. 2 is a block diagram of a second stereoscopic image encoding/decoding device realizing the invention.

FIG. 2 shows a block diagram of another example of the stereoscopic image encoding/decoding device realizing the invention, in the case of receiving the right-eye images of the same number of pixels and the same resolution as the left-eye images and further a high resolution added image of the same number of pixels and the same resolution as the above, for displaying the general plane image at the double resolution.

The stereoscopic image encoding/decoding device receives the left-eye image signal from 201, the right-eye image signal from 202, and the high resolution added image signal from 203. They are defined as the progressive images of frame structure. When the stereoscopic image display can display 352 pixels×288 lines and a high resolution plane display can display 352 pixels×288 lines, assuming that the left-eye image signal 201, the right-eye image signal 202, and the high resolution added image signal 203 are the image signals of each 176 pixels×288 lines, for example, it is possible to get the audiovisual images of each 176 pixels×288 lines for left-eye and right-eye respectively from the left-eye image signal 201 and the right-eye image signal 202 on the stereoscopic image display and get the audiovisual images of 352 pixels×288 lines from the left-eye image signal 201 and the high resolution added image signal 203 on the high resolution plane display.

The left-eye image signal 201, the right-eye image signal 202, and the high resolution added image signal 203 are respectively supplied to a pixel structure converter 205 of a stereoscopic image pre-processor 204. The left-eye image signal 201, the right-eye image signal 202, and the high resolution added image signal 203 are multiplexed in the pixel structure converter 205 and one image is formed, an interlace image virtually consisting of the Top Field and the Bottom Field is formed in a frame/field converter 206, and a frame image and a field image are selected in a selection unit 207. The operations of the pixel structure converter 205, the frame/field converter 206, the selection unit 207 within the stereoscopic image pre-processor 204 will be later described in detail. The image signal supplied from the selection unit 207 is encoded in an image encoding format such as MPEG-2 and MPEG-4 by an MPEG (Moving Picture Expert Group) encoding unit 208, and recorded into a storage and transmitted outward as a encoded stereoscopic image signal, in a transmitting/recording unit 209.

The encoded stereoscopic image signal received outward and reproduced from the storage, after going through the receiving/reproducing unit 210, is MPEG-decoded by an MPEG decoding unit 211, and the interlace image formed by the progressive signal, or the Top Field and the Bottom Field is reproduced. After going through a branch circuit 213 of a stereoscopic image post-processor 212, the image signal is returned to the progressive image of the frame structure by a field/frame converter 214, and it is re-formed as the left-eye image signal, the right-eye image signal, and the high resolution added image signal, by a pixel structure converter 215, and supplied as the outputs 216, 217, and 218 respectively.

Embodiment

With reference to FIG. 3 to FIG. 19, the embodiments of the invention and the operations of the invention will be described.

Figure 3:
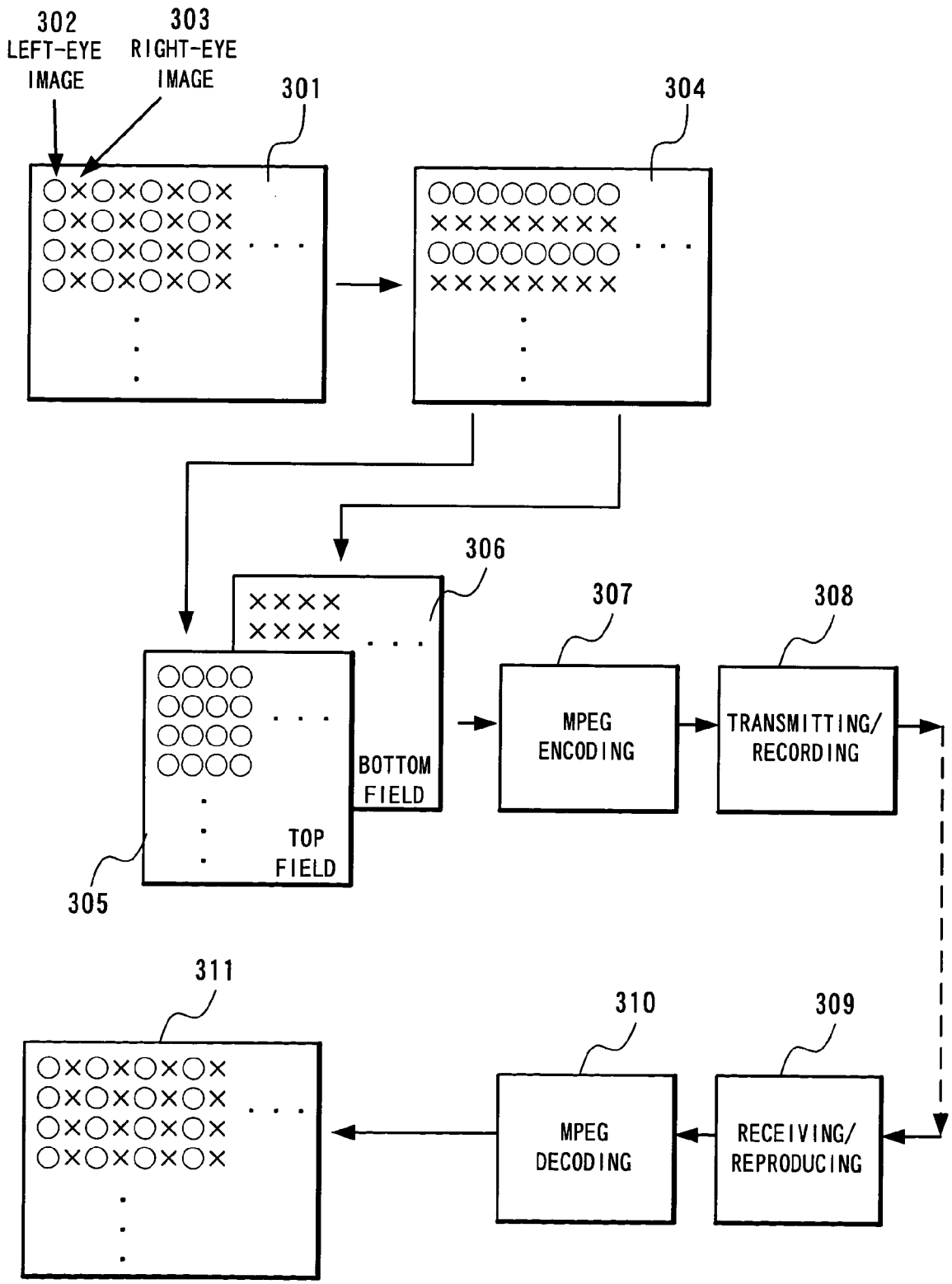
FIG. 3 is a view showing a first embodiment.

FIG. 3 shows a first embodiment.

A stereoscopic image 301 consists of left-eye images (○) 302 and right-eye images (X) 303 and the left-eye image 302 and the right-eye image 303 respectively correspond to the left-eye image signal input 101 and the right-eye image signal input 102 in FIG. 1. They are arranged on a display as illustrated by 301. Namely, the left-eye images and the right-eye images are arranged alternatively in every other vertical line.

The example of FIG. 3 shows the sum of 352 pixels×288 lines including the left-eye images of 176 pixels×288 lines and the right-eye images of 176 pixels×288 lines.

The stereoscopic image 301 is converted into a first conversion image 304 by the pixel structure converter 104. Namely, the left-eye images of 176 pixels×288 lines are arranged in odd lines by only parallel movement and the right-eye images of 176 pixels×288 lines are arranged in even lines by only parallel movement.

The first conversion image 304 is converted into a second conversion image 305 and a third conversion image 306 by the frame/field converter 105. Namely, it is converted into the Top Field image of 176 pixels×288 lines as the second conversion image 305 and the Bottom Field image of 176 pixels×288 lines as the third conversion image 306.

The field images indicated by the second conversion image 305 and the third conversion image 306 are subjected to various processing including MPEG encoding 307, transmitting/recording 308, receiving/reproducing 309, and MPEG decoding 310. The above processing respectively corresponds to the MPEG encoding unit 106, the transmitting/recording unit 107, the receiving/reproducing unit 108, and the MPEG decoding unit 109 in FIG. 1.

In the MPEG encoding 307, a difference between the left-eye image and the right-eye image is detected by the macro block. When it is larger than a rated value, it is judged that a correlation between the Top Field and the Bottom Field is small and a field DCT is applied there, while when it is smaller than a rated value, it is judged that a correlation between the Top Field and the Bottom Field is large and a frame DCT is applied there, hence to do the efficient encoding.

In the stereoscopic image pre-processor 103, the left-eye images are arranged in the odd lines and the right-eye images are arranged in the even lines, or the right-eye images are arranged in the odd lines and the left-eye images are arranged in the even lines, hence to form an interlace image for one image. When, as for the above one image processed by the stereoscopic image pre-processor 103, the optimum block is selected, of the block formed by the data in the odd lines and the even lines and the block formed by the data only in the odd lines or only in the even lines, and the optimum prediction method is selected, of the frame prediction from the forward and backward frames and the field prediction from the forward and backward fields, in the MPEG encoding unit 106, an error between the predicted block data and this block data is orthogonally transformed, quantized, and variable length-encoded and as a result, the block and the prediction method having the minimum code amount of the block data is selected, hence to do the encoding.

The image signal supplied from the MPEG decoding 310, after passing through the field/frame converter 111 and the pixel structure converter 112, will be reproduced as the output stereoscopic image 311 identical to the stereoscopic image 301.

Figure 4:
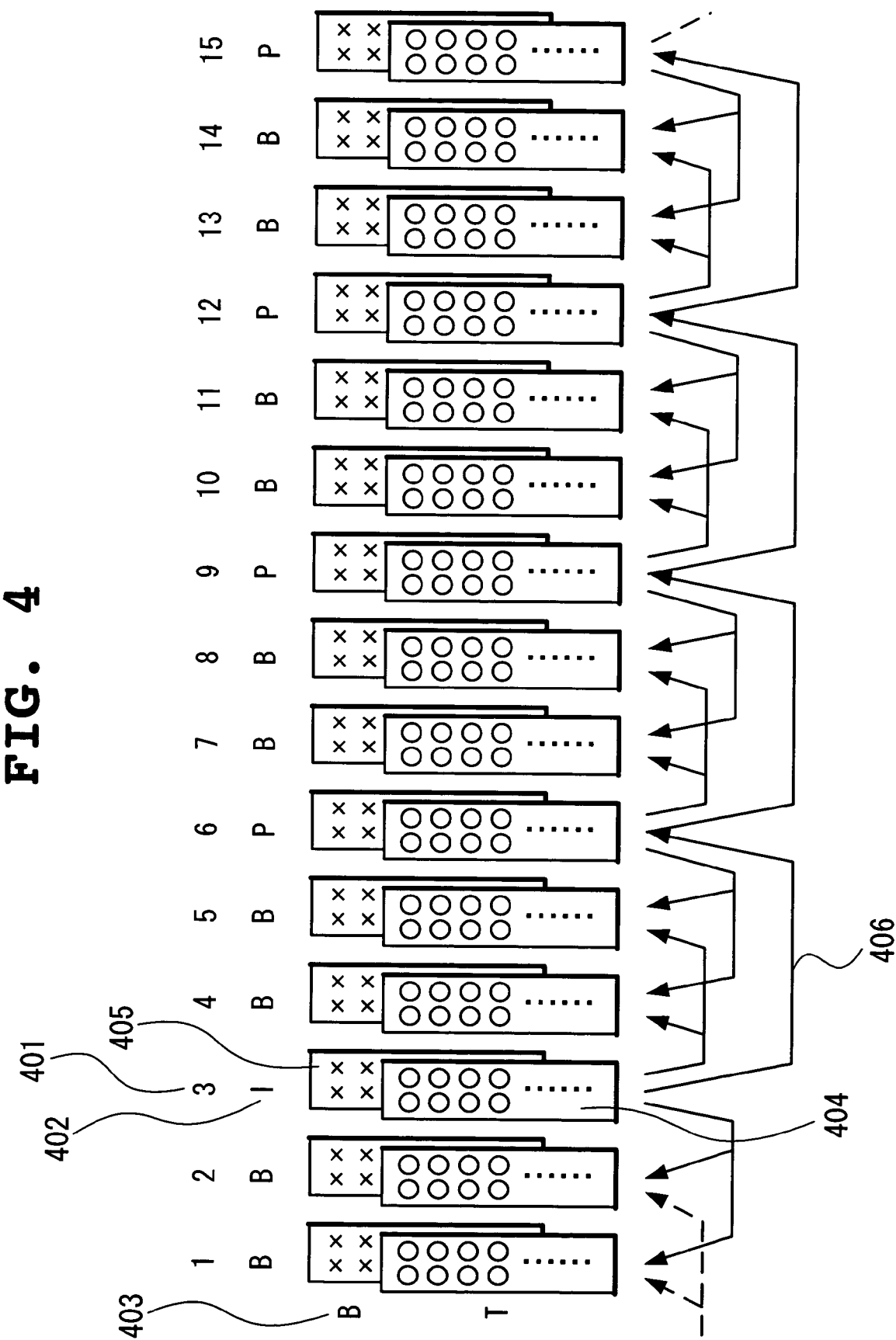
FIG. 4 is a view showing the constitutional example of GOP (Group Of Pictures) in the MPEG encoding of FIG. 3.

FIG. 4 shows the constitutional example of the GOP (Group Of Pictures) in the MPEG encoding 307 of FIG. 3.

The GOP consists of 15 pictures as shown by the picture number 401, and as shown by the picture type 402, it consists of BBIBBPBBPBBPBBP pictures in this order. The reference number 403 shows the Top Field as T and the Bottom Field as B. At this time, as shown by the picture contents 404, the Top Field includes only the left-eye images indicated by ○ and as shown by the picture contents 405, the Bottom Field includes only the right-eye images indicated by X, thereby realizing the encoding shown in FIG. 3. The reference numeral 406 indicates the relationship between the backward prediction picture and the forward prediction picture by an arrow.

Figure 5:
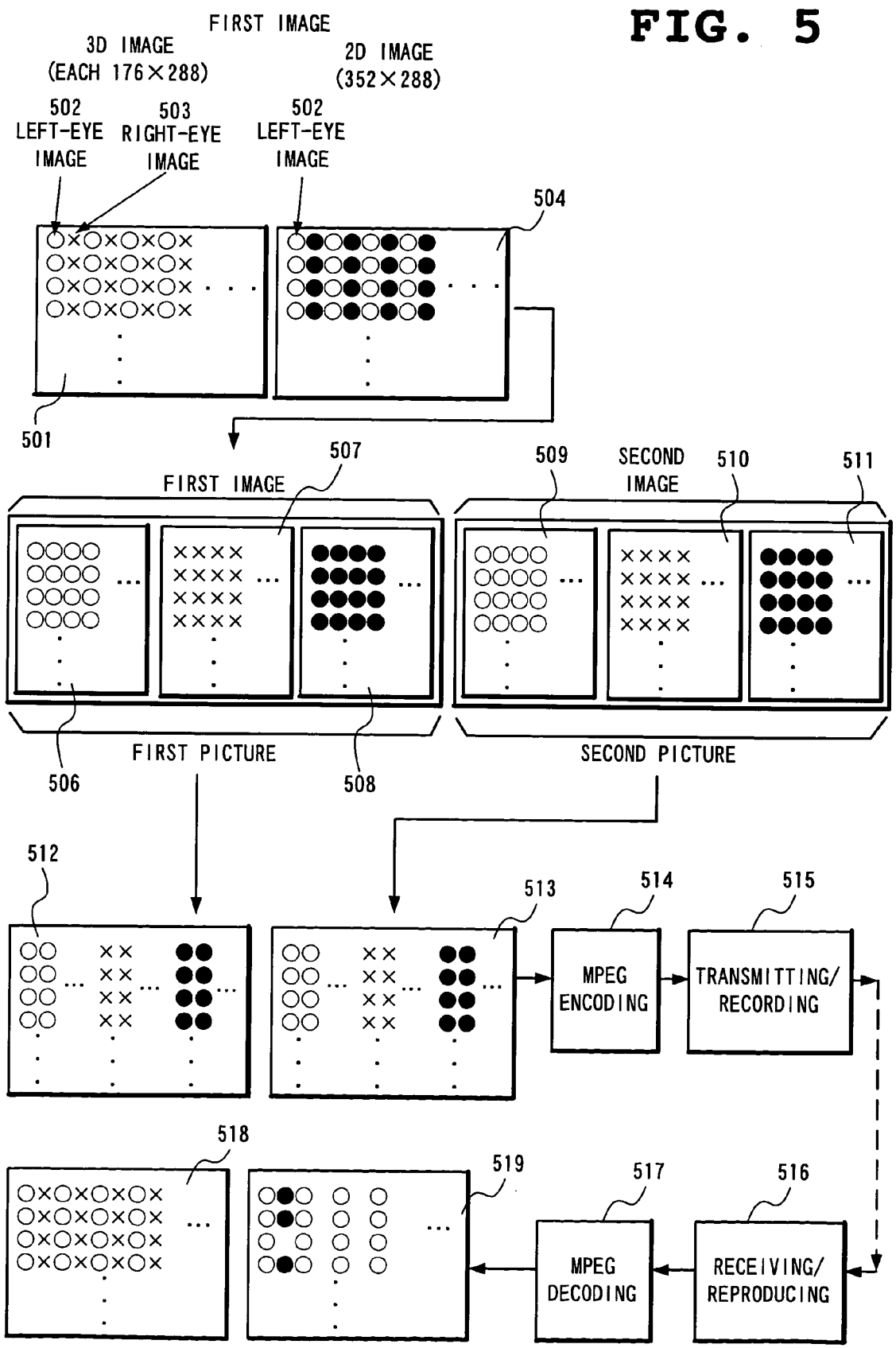
FIG. 5 is a view showing a second embodiment.

FIG. 5 shows a second embodiment.

A stereoscopic image 501 consists of left-eye images (○) 502 and right-eye images (X) 503, and a high resolution plane image 504 consists of the left-eye images (○) 502 and high resolution added images (●) 505 for turning the left-eye images (○) 502 to the images of high resolution. The left-eye images (○) 502 of the stereoscopic image 501 and the left-eye images (○) 502 of the high resolution plane image 504 show the same pixels. The left-eye images 502, the right-eye images 503, and the high resolution added images 505 respectively correspond to the left-eye image signal input 201, the right-eye image signal input 202, and the high resolution added image signal input 203 in FIG. 2. They are arranged on a display as illustrated as the stereoscopic image 501 and the high resolution plane image 504. Namely, in the stereoscopic image 501, the left-eye images 502 and the right-eye images 503 are arranged alternatively in every other vertical line, and in the high resolution plane image 504, the left-eye images 502 and the high resolution added images 505 are arranged alternatively in every other vertical line. The example of FIG. 5 shows the stereoscopic image 501 of the sum of 352 pixels× 288 lines including the left-eye images of 176 pixels×288 lines and the right-eye images of 176 pixels×288 lines, and the high resolution plane image 504 of the sum of 352 pixels× 288 lines including the left-eye images of 176 pixels×288 lines and the high resolution added images of 176 pixels×288 lines.

The stereoscopic image 501 and the high resolution plane image 504 are converted into a left-eye image 506 of the first picture, a right-eye image 507 of the first picture, and a high resolution added image 508 of the first picture and a left-eye image 509 of the second picture, a right-eye image 510 of the second picture, and a high resolution added image 511 of the second picture. Namely, in the first video, the left-eye images 506 of 176 pixels×288 lines are arranged at the left side on the screen by only parallel movement, the right-eye images 507 of 176 pixels×288 lines are arranged at the center on the screen by only parallel movement, and the high resolution added images 508 of 176 pixels×288 lines are arranged at the right side on the screen by only parallel movement, hence to form the first picture 512 of 528 pixels×288 lines. In the second video, the left-eye images 509 of the second picture, the right-eye images 510 of the second picture, and the high resolution added images 511 of the second picture are arranged in the same disposition, hence to form the second picture 513 of 528 pixels×288 lines.

The first picture 512 of 528 pixels×288 lines and the second picture 513 of 528 pixels×288 lines are supplied in a progressive form, without going through the frame/field converter 206, namely, with the output from the pixel structure converter 205 directly selected by the selection unit 207.

The frame images indicated by the first picture 512 of 528 pixels×288 lines and the second picture 513 of 528 pixels× 288 lines are subjected to the processing including the MPEG encoding 514, the transmitting/recording 515, the receiving/reproducing 516, and the MPEG decoding 517. The processing corresponds to the MPEG encoding unit 208, the transmitting/recording unit 209, the receiving/reproducing unit 210, and the MPEG decoding unit 211 respectively in FIG. 2.

The image signal supplied from the MPEG decoding 517, after passing through the pixel structure converter 215 directly from the branch circuit 213, without passing through the field/frame converter 214, will be reproduced as the output stereoscopic image 518 and the output high resolution plane image 519 identical to the stereoscopic image 501 and the high resolution plane image 504.

Figure 6:
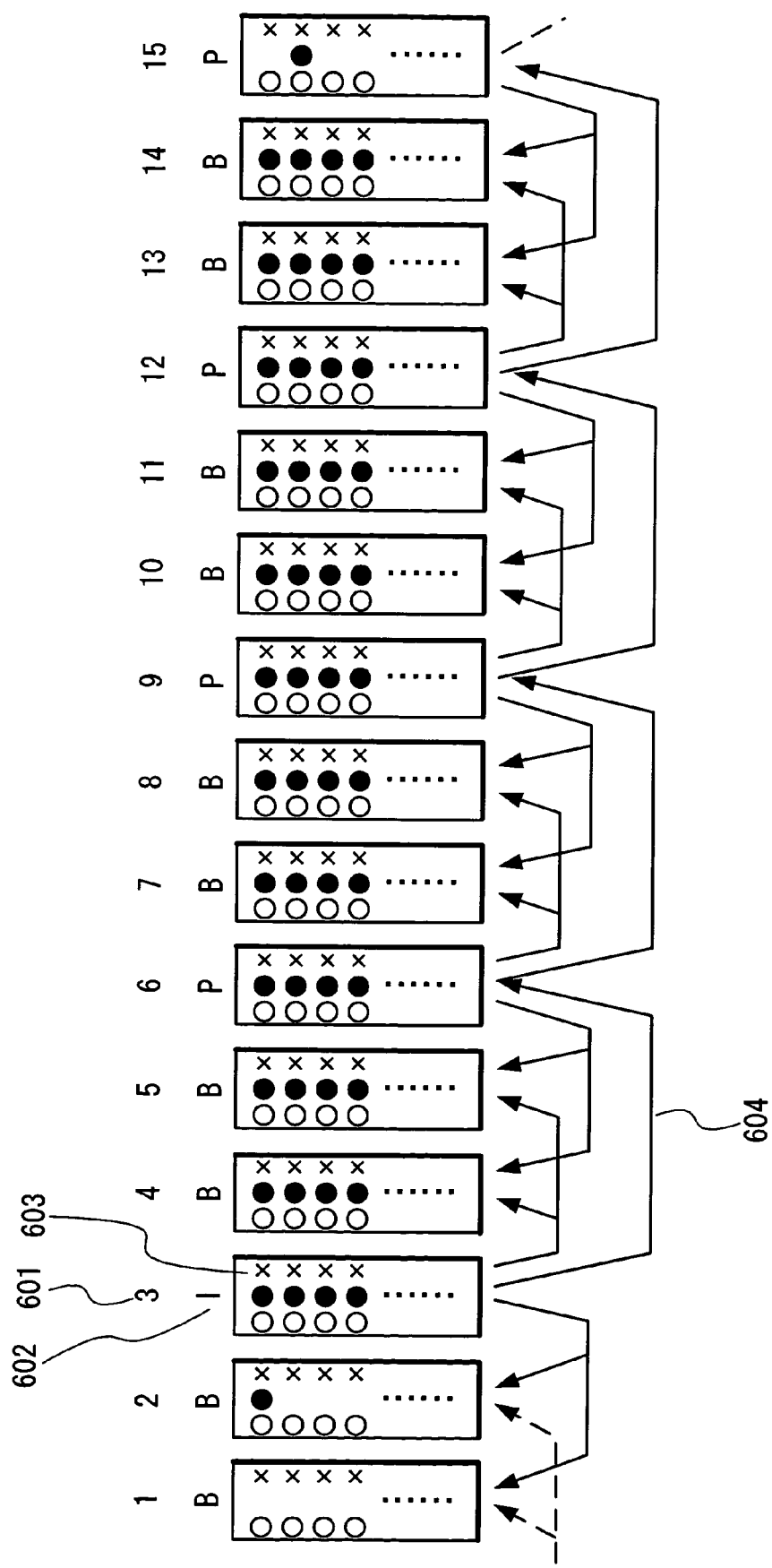
FIG. 6 is a view showing the constitutional example of GOP (Group Of Pictures) in the MPEG encoding of FIG. 5.

FIG. 6 shows the constitutional example of the GOP (Group Of Pictures) in the MPEG encoding 514 of FIG. 5.

The GOP consists of 15 pictures as shown by the picture number 601, and as shown by the picture type 602, it consists of BBIBBPBBPBBPBBP pictures in this order. As shown by the picture contents 603, the left-eye images (○) are shown on the left screen, the high resolution added images ( ) are shown on the middle screen, and the right-eye images (X) are shown on the right screen, thereby realizing the encoding shown in FIG. 5. The reference numeral 604 indicates the relationship between the backward prediction picture and the forward prediction picture by an arrow.

Figure 7:
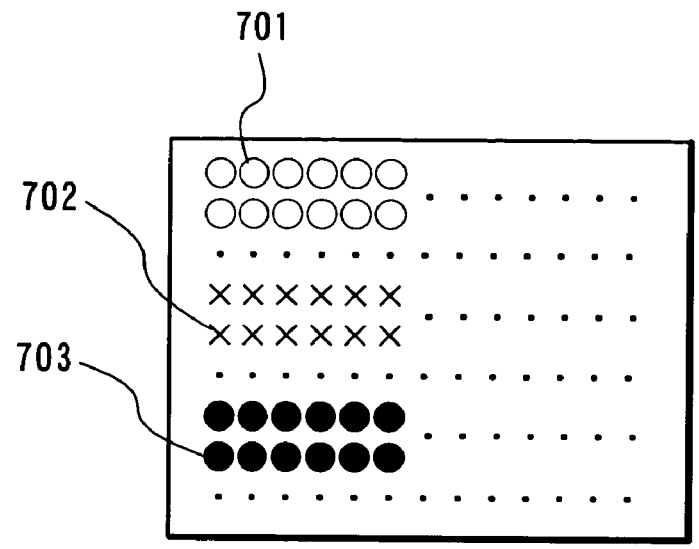
FIG. 7 is a view showing another arrangement example than the arrangement of FIG. 5.

FIG. 7 shows another arrangement of the first picture 512 of 528 pixels×288 lines and the second picture 513 of 528 pixels×288 lines of FIG. 5.

The left-eye images (○) 701 are shown on the top screen, the right-eye images (X) 702 are shown on the middle screen, and the high resolution added images (●) 703 are shown on the bottom screen. When arranging the stereoscopic image 501 and the high resolution plane image 504 of FIG. 5, the screen of FIG. 7 becomes 176 pixels×864 lines.

Figure 8:
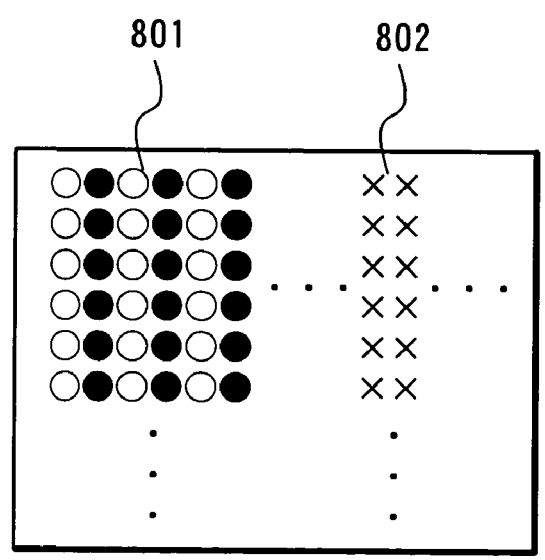
FIG. 8 is a view showing another arrangement example than the arrangement of FIG. 5.

FIG. 8 shows another arrangement of the first picture 512 of 528 pixels×288 lines and the second picture 513 of 528 pixels×288 lines of FIG. 5.

The left-eye images (○)+high resolution added images (●) 801 are arranged in every other vertical line on the left screen to the middle, and the right-eye images (X) 802 are arranged on the right screen. When arranging the stereoscopic image 501 and the high resolution plane image 504 of FIG. 5, the screen of FIG. 8 becomes 528 pixels×288 lines.

As mentioned above, although several arrangement examples have been described, the left-eye images (○), the high resolution added images (●), and the right-eye images (X) may be arranged in another sequence.

For example, the first picture 512 of 528 pixels×288 lines and the second picture 513 of 528 pixels×288 lines in FIG. 5 may be arranged in the order of the right-eye images (X), the left-eye images (○), and the high resolution added images (●), or may be arranged in the other order.

For example, in FIG. 7, the above may be arranged in the order of the right-eye images (X) 702, the left-eye images (○) 701, and the high resolution added images (●) 703, or may be arranged in the other order.

For example, in FIG. 8, the above may be arranged in the order of the right-eye images (X) 802 and the left-eye images+high resolution added images (○, ●) 801.

Alternatively, it may be vertically arranged in the order of the left-eye images+high resolution added images (○, ●) 801 and the right-eye images (X) 802.

Figure 9:
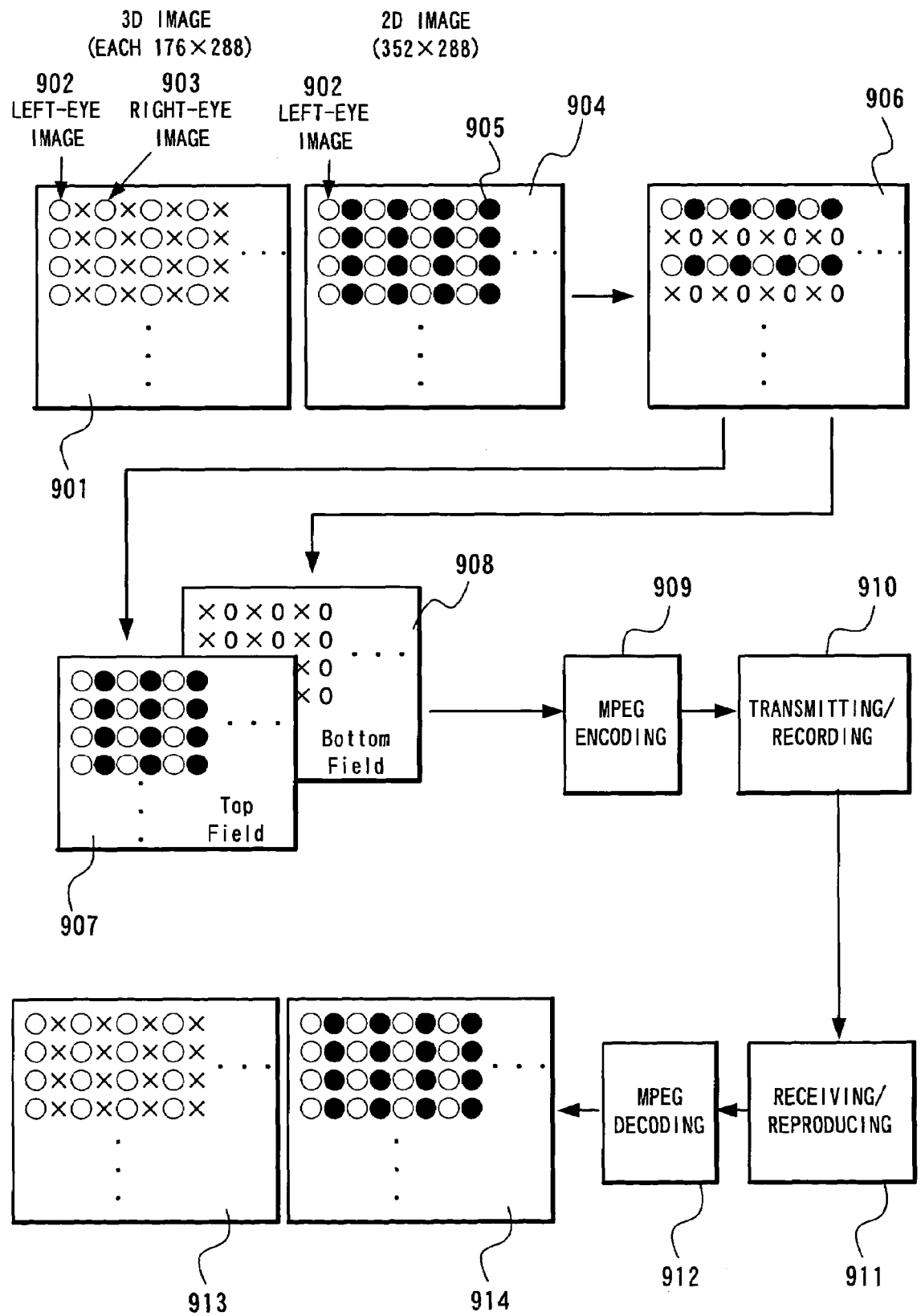
FIG. 9 is a view showing a third embodiment.

FIG. 9 shows a third embodiment.

A stereoscopic image 901 consists of the left-eye images (○) 902 and the right-eye images (X) 903, and a high resolution plane image 904 consists of the left-eye images (○) 902 and the high resolution added images ( ) 905 for turning the left-eye images (○) 902 to the images of high resolution. The left-eye images 902, the right-eye images 903, and the high resolution added images 905 respectively correspond to the left-eye image signal input 201, the right-eye image signal input 202, and the high resolution added image signal input 203 in FIG. 2. They are arranged on a display as illustrated as the stereoscopic image 901 and the high resolution plane image 904. Namely, in the stereoscopic image 901, the left-eye images and the right-eye images are arranged alternatively in every other vertical line, and in the high resolution plane image 904, the left-eye images and the high resolution added images are arranged alternatively in every other vertical line. The example of FIG. 9 shows the stereoscopic image 901 of the sum of 352 pixels×288 lines including the left-eye images of 176 pixels×288 lines and the right-eye images of 176 pixels×288 lines, and the high resolution plane image 904 of the sum of 352 pixels×288 lines including the left-eye images of 176 pixels×288 lines and the high resolution added images of 176 pixels×288 lines.

The stereoscopic image 901 and the high resolution plane image 904 are converted into an interlace conversion image 906 by the pixel structure converter 205. Namely, the high resolution plane images 904 of 352 pixels×288 lines are arranged in the odd lines by only parallel movement, and the right-eye images 903 of 176 pixels×288 lines are arranged in the even lines. However, the number of the pixels per line of the high resolution plane image does not conform to that of the right-eye image, and therefore, as for the right-eye image, "0" is inserted into every pixel, as shown in the interlace conversion image 906, to form 352 pixels×288 lines, and then moved in parallel and arranged in the even lines as they are. The further detail about this will be described later. As a result, in the interlace conversion image 906, the frame data for 352 pixels×576 lines is arranged.

The interlace conversion image 906 is converted into the Top Field image 907 of 352 pixels×288 lines and the Bottom Field image 908 of 352 pixels×288 lines by the frame/field converter 206.

Accordingly, the Top Field image 907 of 352 pixels×288 lines and the Bottom Field image 908 of 352 pixels×288 lines are interlaced with each other after passing through the frame/field converter 206, namely after the output from the frame/field converter 206 is selected by the selection unit 207.

The processing including the MPEG encoding 909, the transmitting/recording 910, the receiving/reproducing 911, and the MPEG decoding 912 is performed on the Top Field image 907 of 352 pixels×288 lines and the Bottom Field image 908 of 352 pixels×288 lines. The above processing respectively corresponds to the MPEG encoding unit 208, the transmitting/recording unit 209, the receiving/reproducing unit 210, and the MPEG decoding unit 211 in FIG. 2.

In the MPEG encoding 909, a difference between the left-eye image and the right-eye image is detected by the macro block. When it is larger than a rated value, it is judged that a correlation between the Top Field and the Bottom Field is small and a field DCT is applied there, while when it is smaller than a rated value, it is judged that a correlation between the Top Field and the Bottom Field is large and a frame DCT is applied there, hence to do the efficient encoding.

The image signal supplied from the MPEG decoding 912 is converted into the frame structure again, after passing through the field/frame converter 214 from the branch circuit 213, and it will be reproduced as the output stereoscopic image 913 and the output high resolution plane image 914 identical to the stereoscopic image 901 and the high resolution plane image 904, through the pixel structure converter 215.

FIG. 10 shows the state of inserting "0" into every pixel of the right-eye images 903, within the range of 8 pixels×8 lines (DCT block). As indicated by the underline of 1001, "0" is inserted into every pixel and as a result, the right-eye images are arranged in the odd columns of the first, third, fifth, and seventh and "0" is inserted in the even columns of the second, fourth, sixth, and eighth. They may be inverted. The value to be inserted is not restricted to "0".

FIG. 11 shows the state of inserting the same value as the prior pixel (left pixel) in every pixel in the right-eye image 903, within the range of 8 pixels×8 lines. As indicated by the underline of 1101, the same data as the prior pixel is inserted into every pixel, and as a result, the right-eye images are arranged in the odd columns of the first, third, fifth, and seventh, and the same data as the prior pixel is inserted into the even columns of the second, fourth, sixth, and eighth. They may be inverted, and the same data as the posterior pixel (right pixel) may be used.

FIG. 12 shows the state of inserting the average value of the prior pixel (left pixel) and the posterior pixel (right pixel) in every pixel in the right-eye image 903, within the range of 8 pixels×8 lines. As indicated by the underline of 1201, the average value of the prior pixel (left pixel) and the posterior pixel (right pixel) is inserted in every pixel. As for the rightmost screen, "0" may be arranged there as shown by 1202. As a result, the right-eye images are arranged in the odd columns of the first, third, fifth, and seventh, the average value of the prior pixel (left pixel) and the posterior pixel (right pixel) is inserted in the even columns of the second, fourth, sixth, and eighth, and "0" is inserted into the rightmost screen.

FIG. 13 again shows the state of inserting the average value of the prior pixel (left pixel) and the posterior pixel (right pixel) in every pixel in the right-eye images 903, within the range of 8 pixels×8 lines. As indicated by the underline of 1301, the average value of the prior pixel (left pixel) and the posterior pixel (right pixel) is inserted in every pixel. As for the rightmost screen, as shown by 1302, the same data as its left pixel may be arranged there. As a result, the right-eye images are arranged in the odd columns of the first, third, fifth, and seventh, the average value of the prior pixel (left pixel) and the posterior pixel (right pixel) is respectively inserted in the even columns of the second, fourth, sixth, and eighth, and the same data as its left pixel is inserted into the rightmost screen.

Figure 14:
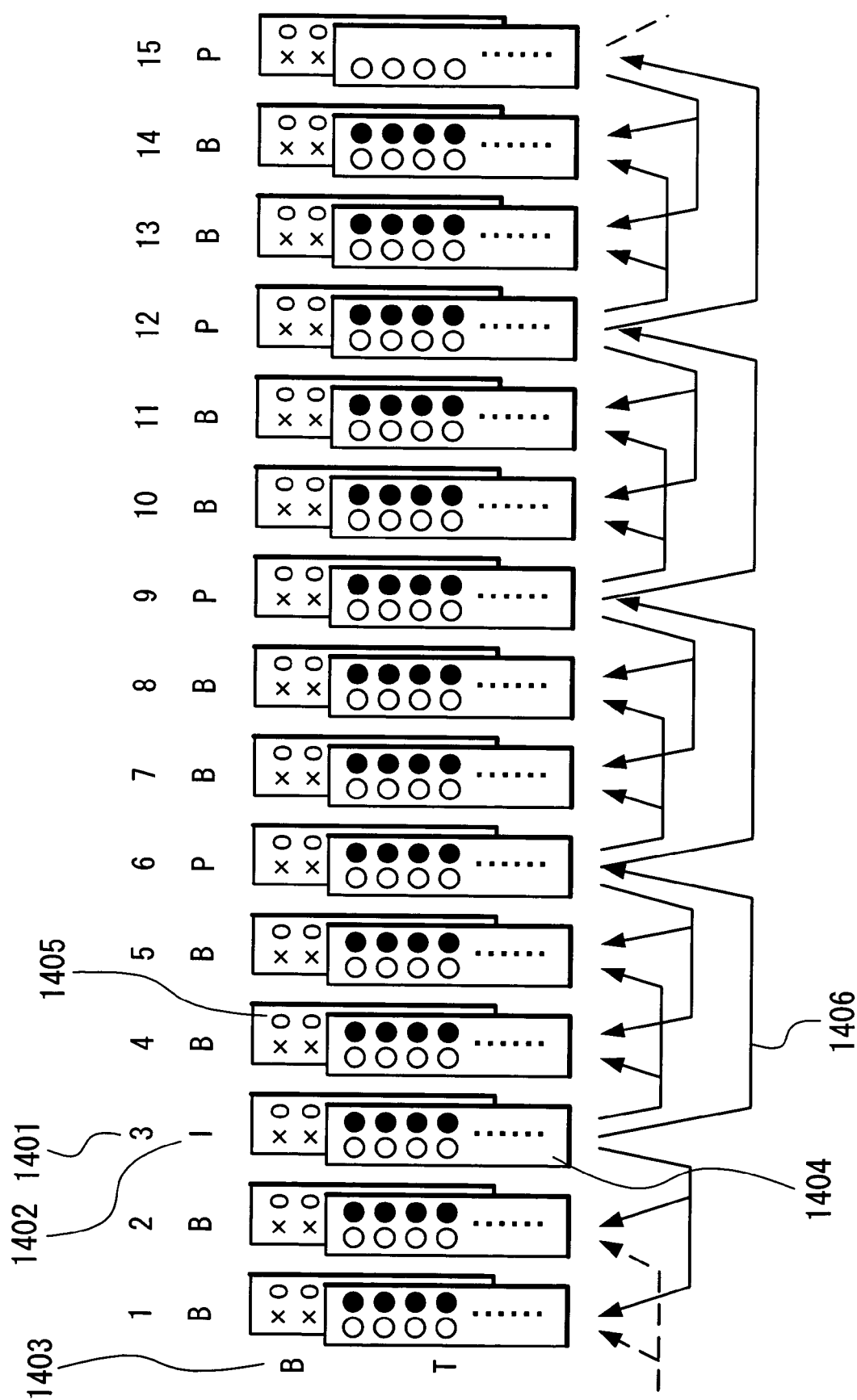
FIG. 14 is a view showing the constitutional example of GOP (Group Of Pictures) in the MPEG encoding of FIG. 9.

FIG. 14 shows the constitutional example of GOP (Group Of Pictures) in the MPEG encoding 909 of FIG. 9.

The GOP consists of 15 pictures as shown by the picture number 1401, and as shown by the picture type 1402, it consists of BBIBBPBBPBBPBBP pictures in this order. In 1403, the Top Field is indicated by T and the Bottom Field is indicated by B. As shown in the picture contents 1404, the Top Field includes the high resolution plane images (○●) by combination of the left-eye images (○) and the high resolution added images ( ), and as shown in the picture contents 1405, the Bottom Field includes the data (X0) by combination of the right-eye images (X) and the inserted "0" (0), thereby realizing the encoding as shown in FIG. 9. The reference numeral 1406 indicates the relationship between the backward prediction picture and the forward prediction picture by an arrow.

Figure 15:
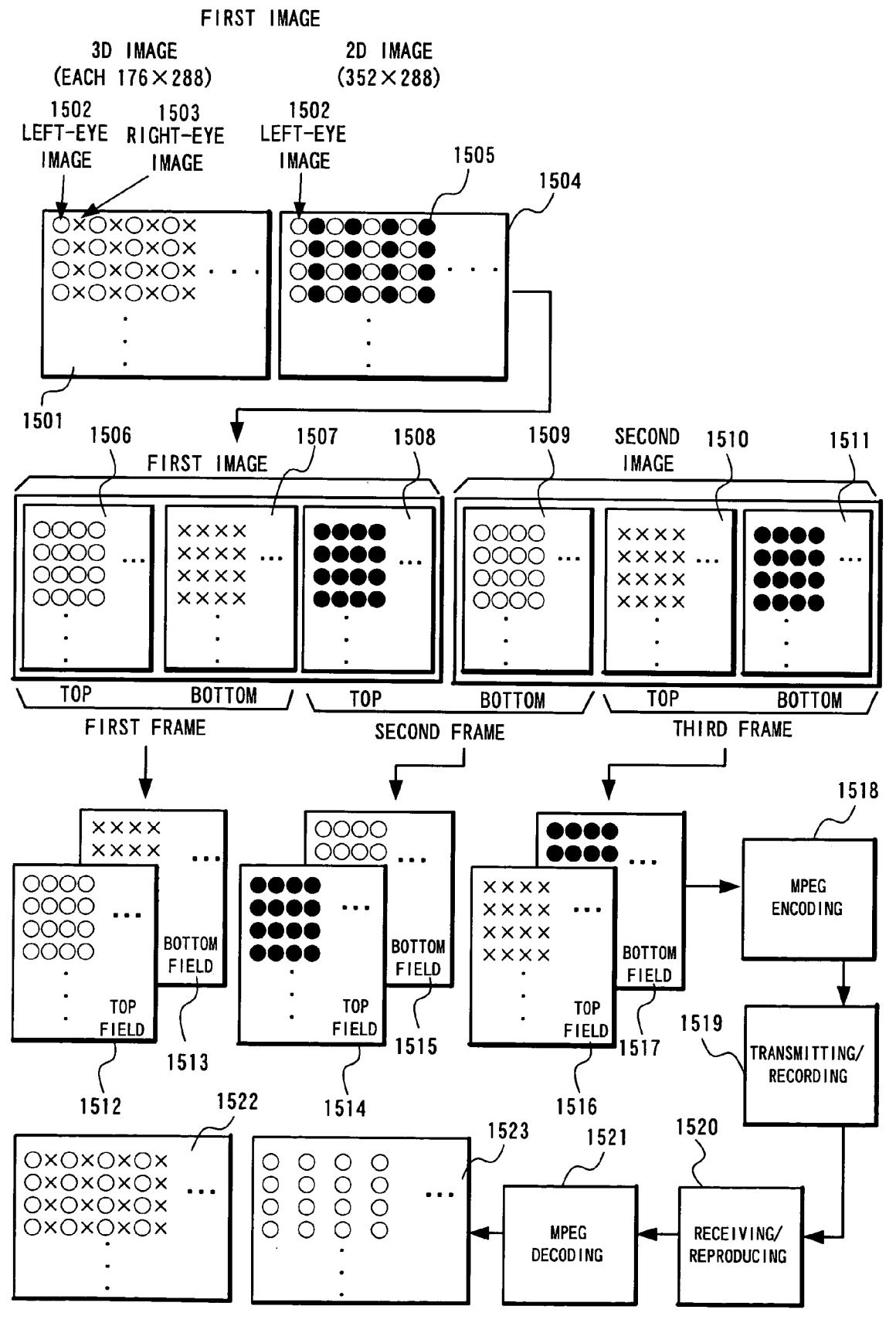

FIG. 15 shows a fourth embodiment.

A stereoscopic image 1501 consists of the left-eye images (○) 1502 and the right-eye images (X) 1503, and a high resolution plane image 1504 consists of the left-eye images (○) 1502 and the high resolution added images (●) 1505 for turning the left-eye images (○) 1502 to the images of high resolution. The left-eye images 1502, the right-eye images 1503, and the high resolution added images 1505 respectively correspond to the left-eye image signal input 201, the right-eye image signal input 202, and the high resolution added image signal input 203 in FIG. 2. They are arranged on a display as illustrated as the stereoscopic image 1501 and the high resolution plane image 1504. Namely, in the stereoscopic image 1501, the left-eye images and the right-eye images are arranged alternatively in every other vertical line, and in the high resolution plane image 1504, the left-eye images and the high resolution added images are arranged alternatively in every other vertical line. The example of FIG. 15 shows the stereoscopic image 1501 of the sum of 352 pixels×288 lines including the left-eye images of 176 pixels× 288lines and the right-eye images of 176 pixels×288 lines, and the high resolution plane image 1504 of the sum of 352 pixels×288 lines including the left-eye images of 176 pixels× 288 lines and the high resolution added images of 176 pixels× 288 lines.

The stereoscopic image 1501 and the high resolution plane image 1504 are converted into a first frame Top Field image 1506, a first frame Bottom Field image 1507, a second frame Top Field image 1508, a second frame Bottom Field image 1509, a third frame Top Field image 1510, and a third frame Bottom Field image 1511, by the pixel structure converter 205. Namely, the left-eye image 1502 of the first image and the right-eye image 1503 of the first image correspond to 1506 and 1507 of the first frame, the high resolution added image 1505 of the first image and the left-eye image 1508 of the second image, not illustrated, correspond to the 1508 and 1509 of the second frame, and the right-eye image of the second image and the high resolution added image of the second image, not illustrated, correspond to 1510 and 1511 of the third frame. Namely, three frames are formed by two images.

The images 1506 to 1511 are converted into 1512 to 1517 by the frame/field converter 206. Specifically, they are converted into the Top Field image 1512 of 176 pixels×288 lines and the Bottom Field image 1513 of 176 pixels×288 lines, and hereinafter into the Top Field image 1514, the Bottom Field image 1515, the Top Field image 1516, and the Bottom Field image 1517 of 176 pixels×288 lines similarly.

Accordingly, the images 1512 to 1517 are interlaced with each other after passing through the frame/field converter 206, namely after the output from the frame/field converter 206 is selected by the selection unit 207.

The processing including the MPEG encoding 1518, the transmitting/recording 1519, the receiving/reproducing 1520, and the MPEG decoding 1521 is performed on the images 1512 to 1517. The above processing respectively corresponds to the MPEG encoding unit 208, the transmitting/ recording unit 209, the receiving/reproducing unit 210, and the MPEG decoding unit 211 in FIG. 2.

In the MPEG encoding 1518, a difference between the left-eye image and the right-eye image is detected by the macro block. When it is larger than a rated value, it is judged that a correlation between the Top Field and the Bottom Field is small and a field DCT is applied there, while when it is smaller than a rated value, it is judged that a correlation between the Top Field and the Bottom Field is large and a frame DCT is applied there, hence to do the efficient encoding.

The image signal supplied from the MPEG decoding 1521 is converted into the frame structure again, after passing through the field/frame converter 214 from the branch circuit 213, and it will be reproduced as the output stereoscopic image 1522 and the output high resolution plane image 1523 identical to the stereoscopic image 1501 and the high resolution plane image 1504, through the pixel structure converter 215.

Figure 16:
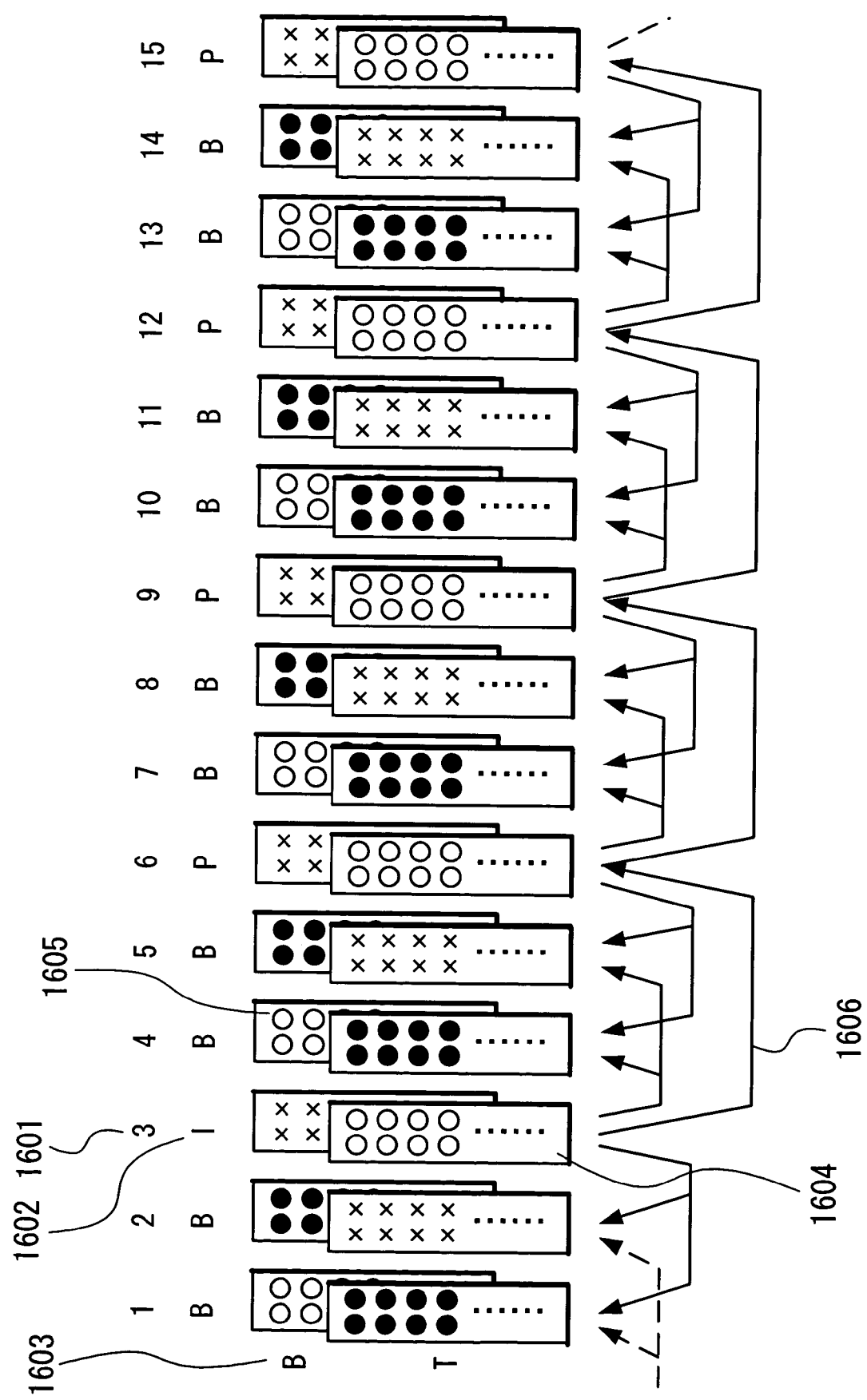
FIG. 16 is a view showing the constitutional example of GOP (Group Of Pictures) in the MPEG encoding of FIG. 15.

FIG. 16 shows the constitutional example of GOP (Group Of Pictures) in the MPEG encoding 1518 of FIG. 15.

The GOP consists of 15 pictures as shown by the picture number 1601, and as shown by the picture type 1602, it consists of BBIBBPBBPBBPBBP pictures in this order. In 1603, the Top Field is indicated by T and the Bottom Field is indicated by B. As shown in the picture contents 1604 and 1605, a combination of the Top Field and the Bottom Field includes a combination of the left-eye image (○) and right-eye image (X), a combination of the high resolution added image (●) and left-eye image (○), and a combination of the right-eye image (X) and high resolution added image (●), thereby realizing the encoding as shown in FIG. 15.

One screen of a combination of the stereoscopic image and the high resolution plane image is shown by 1.5 frames. Further, since the field is inverted in the current 1.5 frames indicating one screen and the next 1.5 frames indicating the next screen, the field structure is completed in three frames. For example, it is the sixth frame that the field structure of the third frame of FIG. 16 first agrees with. As illustrated in FIG. 16, when the GOP consists of 15 frames, 15 frames can be divided by three frames completely, into the same frame structure in each GOP. Namely, the next GOP has the same structure as the current GOP shown in FIG. 16; in the third frame in the next GOP, the Top Field includes the left-eye images (○) and the Bottom Field includes the right-eye images (X).

When each GOP has the same frame structure, the I picture, for example, in FIG. 16, always includes the left-eye images (○) in the Top Field and the right-eye images (X) in the Bottom Field constantly, and the quality of the stereoscopic image (left-eye image and the right-eye image) is much better than that of the high resolution plane image (high resolution added image).

The reference numeral 1606 indicates the relationship between the backward prediction picture and the forward prediction picture by an arrow.

Here in FIG. 16, although the left-eye images (○), the right-eye images (X), and the high resolution added images (●) are arranged in this order, the arrangement order may be changed. For example, they may be arranged as follows: in the odd lines of the third frame in 1601, the left-eye images (○); in the even lines of the third frame, the right-eye images (X); in the odd lines of the fourth frame, the high resolution added images ( ); in the even lines of the fourth frame, the high resolution added images ( ); in the odd lines of the fifth frame, the left-eye images (○); in the even line of the fifth frame, the right-eye images (X), and hereinafter this arrangement will be repeated in every three frames. According to this, the left-eye images are always in the odd lines (Top Field) and the right-eye images are always in the even lines (Bottom Field), thereby enhancing the prediction efficiency, namely the encoding efficiency.

Figure 17:
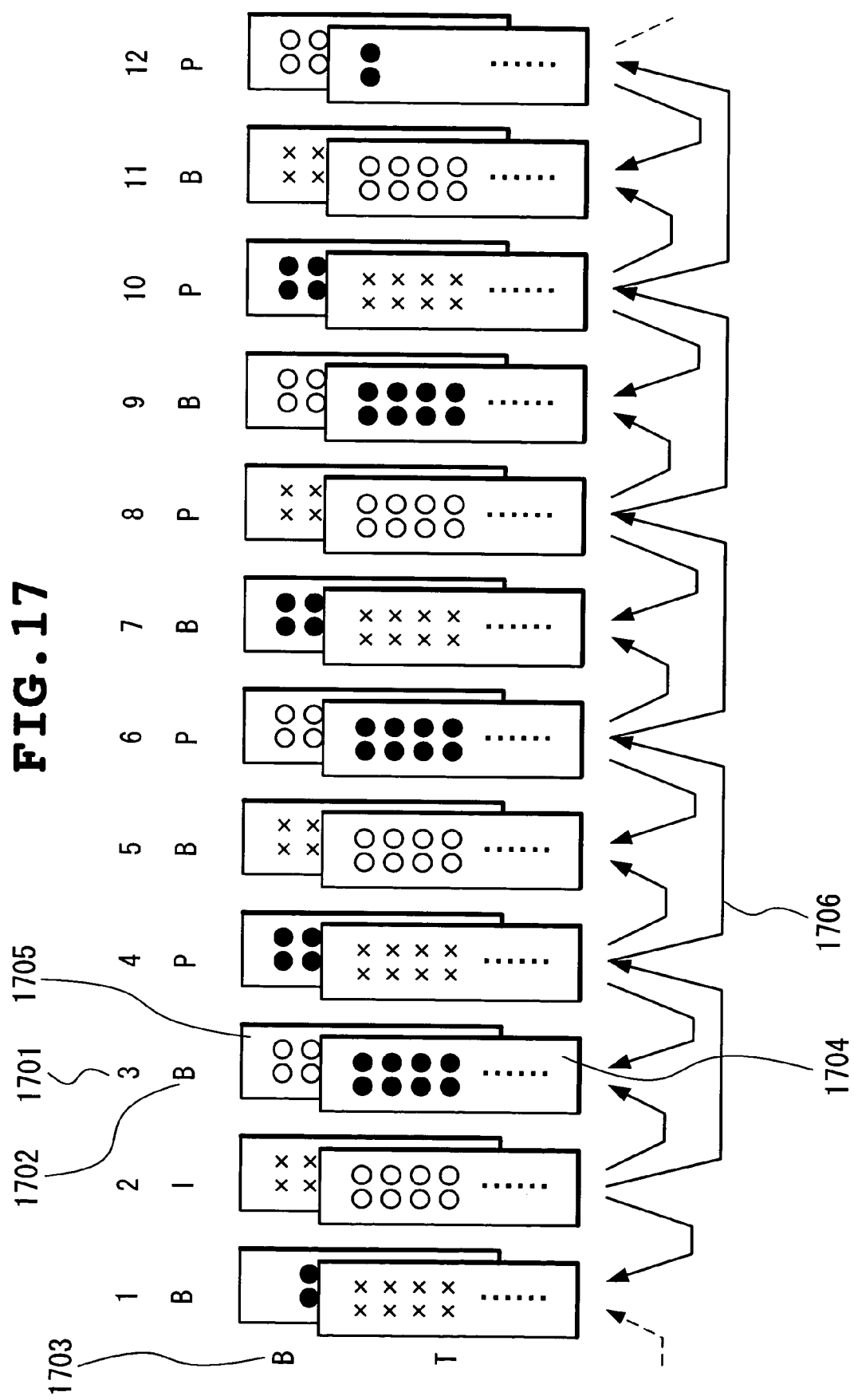
FIG. 17 is a view showing the constitutional example of GOP (Group Of Pictures) in the MPEG encoding of FIG. 15.

FIG. 17 shows another constitutional example of GOP (Group Of Pictures) in the MPEG encoding 1518 of FIG. 15.

The GOP consists of 12 pictures as shown by the picture number 1701, and as shown by the picture type 1702, it consists of BIBPBPBPBPBP pictures in this order. In 1703, the Top Field is indicated by T and the Bottom Field is indicated by B. As shown in the picture contents 1704 and 1705, a combination of the Top Field and the Bottom Field includes a combination of the left-eye image (○) and right-eye image (X), a combination of the high resolution added image (●) and left-eye image (○), and a combination of the right-eye image (X) and high resolution added image (●), thereby realizing the encoding as shown in FIG. 15.

As illustrated in FIG. 17, when the GOP consists of 12 frames, 12 frames can be divided by three frames completely, into the same frame structure in each GOP. Namely, the next GOP has the same structure as the current GOP shown in FIG. 17; in the second frame in the next GOP, the Top Field includes the left-eye images (○) and the Bottom Field includes the right-eye images (X).

The reference numeral 1706 indicates the relationship between the backward prediction picture and the forward prediction picture by an arrow.

Figure 18:
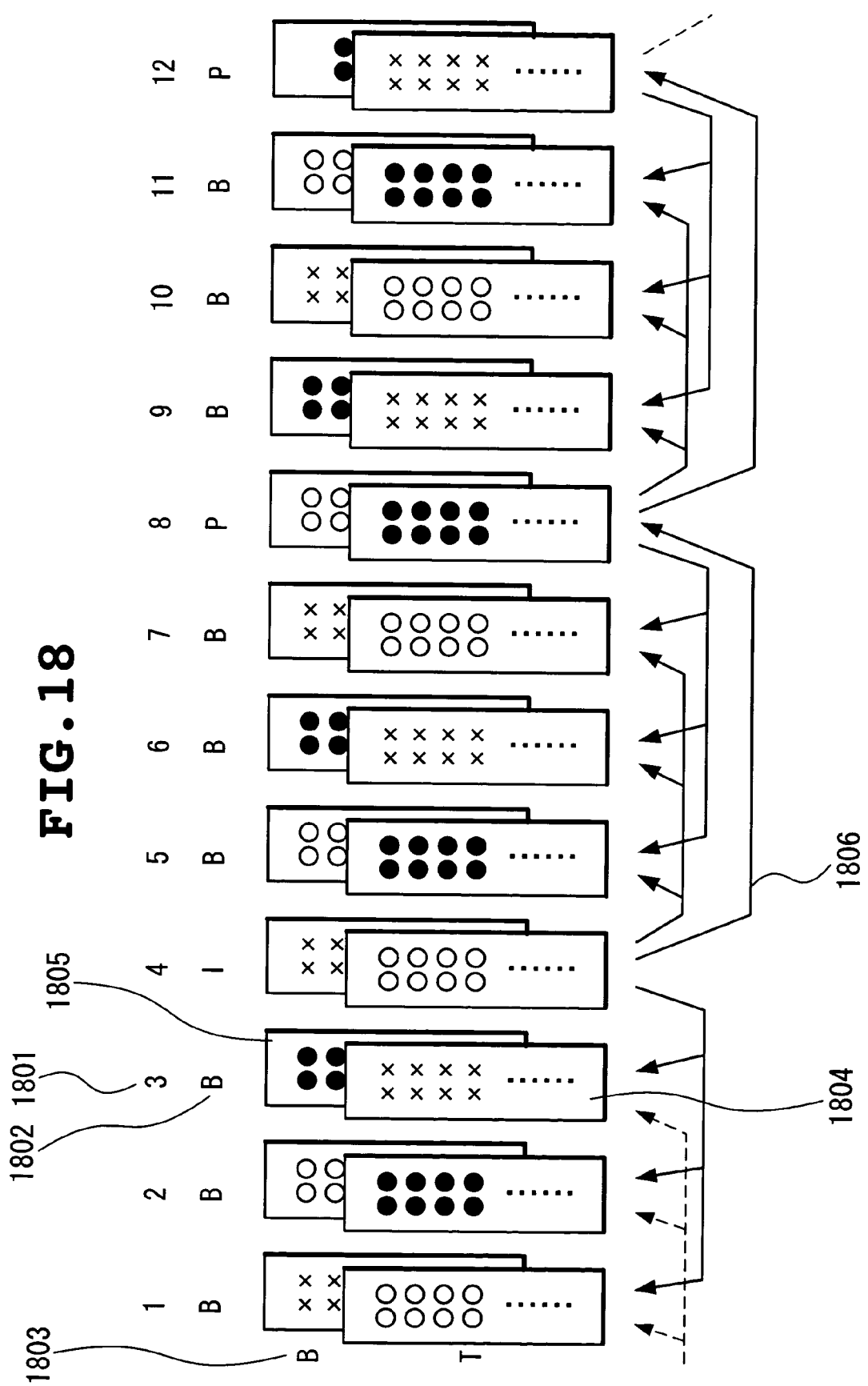
FIG. 18 is a view showing the constitutional example of GOP (Group Of Pictures) in the MPEG encoding of FIG. 15.

FIG. 18 shows further another constitutional example of GOP (Group Of Pictures) in the MPEG encoding 1518 of FIG. 15.

The GOP consists of 12 pictures as shown by the picture number 1801, and as shown by the picture type 1802, it consists of BBBIBBBPBBBP pictures in this order. In 1803, the Top Field is indicated by T and the Bottom Field is indicated by B. As shown in the picture contents 1804 and 1805, a combination of the Top Field and the Bottom Field includes a combination of the left-eye image (○) and right-eye image (X), a combination of the high resolution added image (●) and left-eye image (○), and a combination of the right-eye image (X) and high resolution added image (●), thereby realizing the encoding shown in FIG. 15.

As illustrated in FIG. 18, when the GOP consists of 12 frames, 12 frames can be divided by three frames completely, into the same frame structure in each GOP. Namely, the next GOP has the same structure as the current GOP shown in FIG. 18; in the fourth frame in the next GOP, the Top Field includes the left-eye images (○) and the Bottom Field includes the right-eye images (X).

The reference numeral 1806 indicates the relationship between the backward prediction picture and the forward prediction picture by an arrow.

Figure 19:
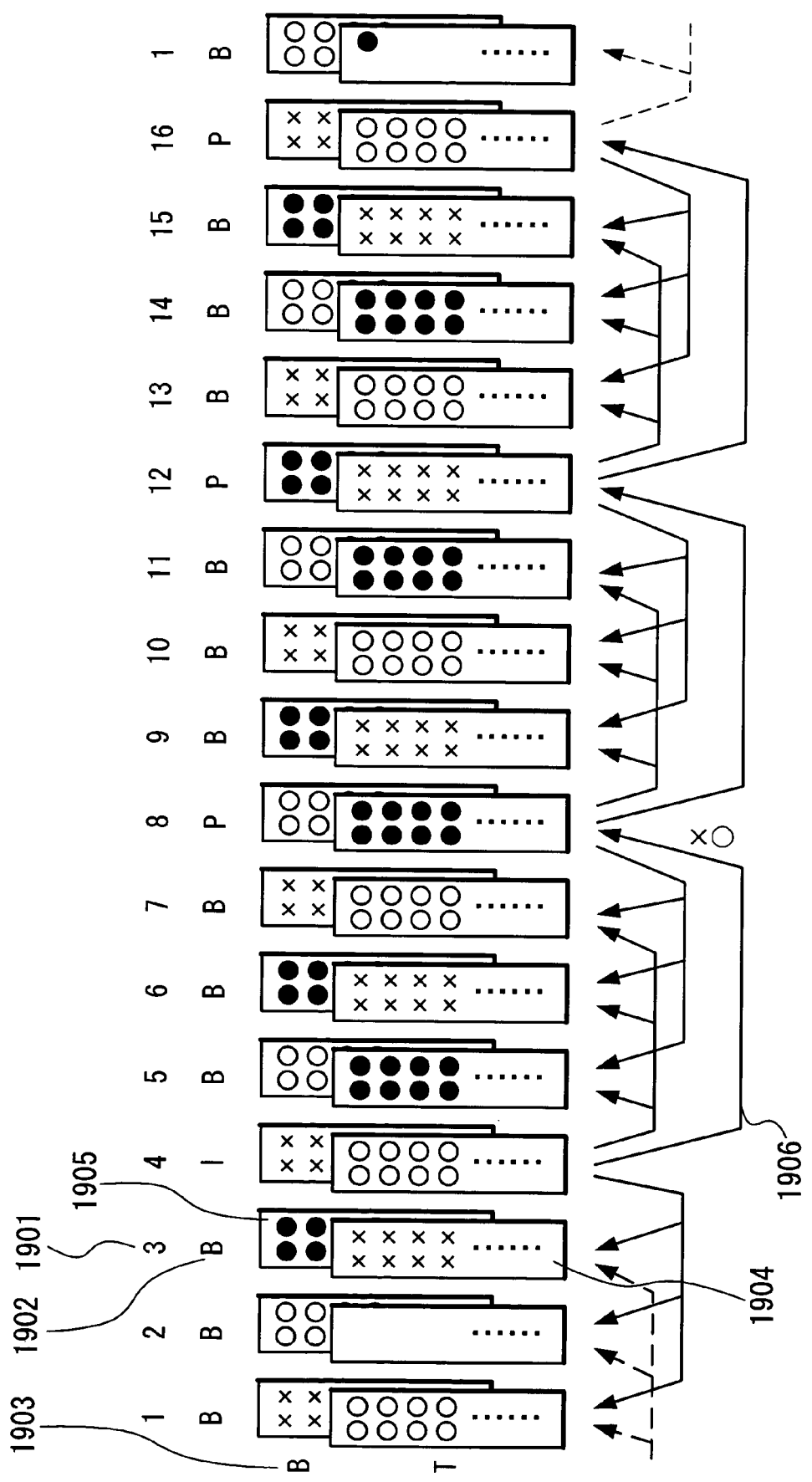
FIG. 19 is a view showing the constitutional example of GOP (Group Of Pictures) in the MPEG encoding of FIG. 15.
Figure 20:
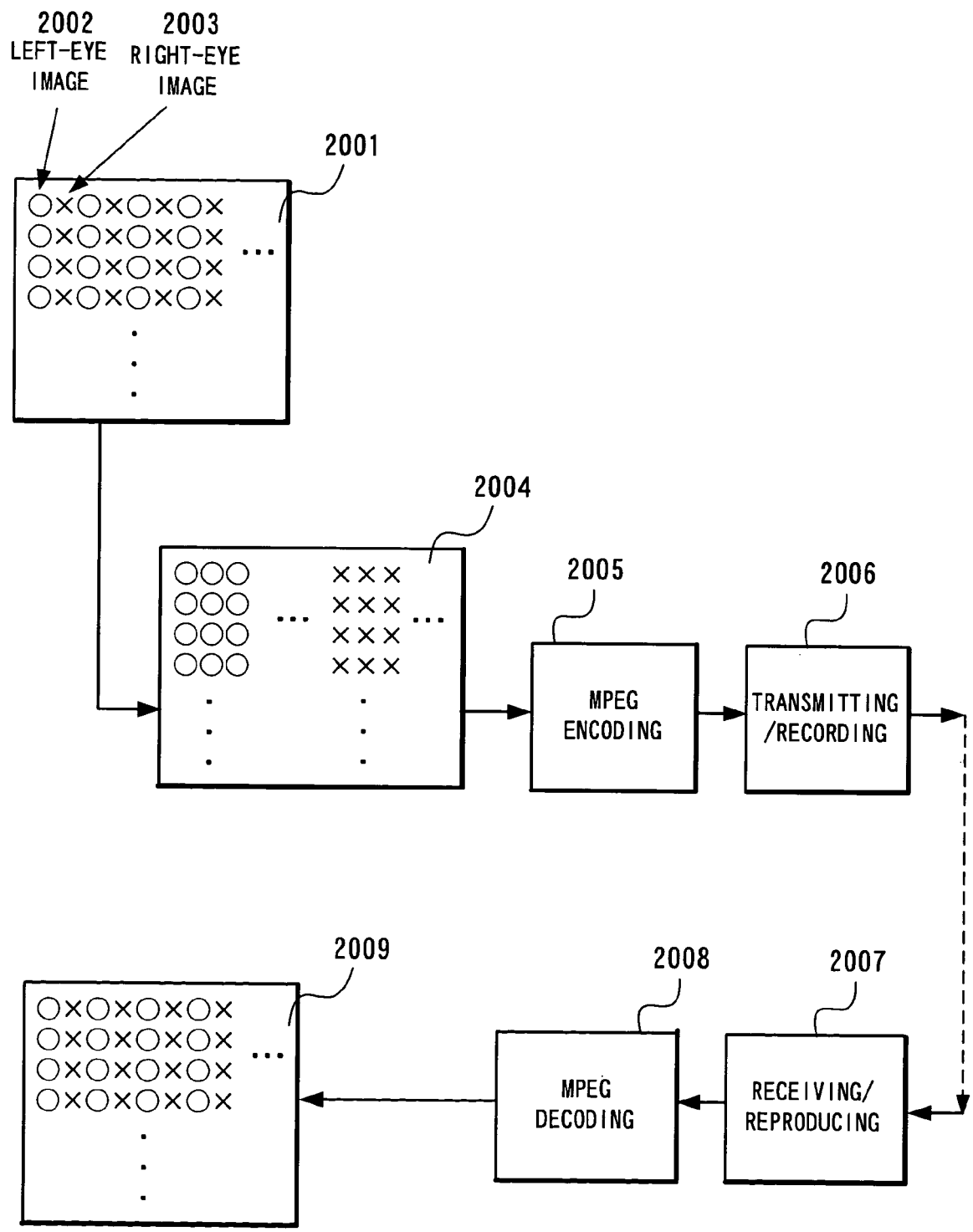
FIG. 20 is a view showing the conventional example.

FIG. 19 shows further another constitutional example of GOP (Group Of Pictures) in the MPEG encoding 1518 of FIG. 15.

The GOP consists of 16 pictures as shown by the picture number 1901, and as shown by the picture type 1902, it consists of BBBIBBBPBBBPBBBP pictures in this order. In 1903, the Top Field is indicated by T and the Bottom Field is indicated by B. As shown in the picture contents 1904 and 1905, a combination of the Top Field and the Bottom Field includes a combination of the left-eye image (○) and right-eye image (X), a combination of the high resolution added image (●) and left-eye image (○), and a combination of the right-eye image (X) and high resolution added image (●), thereby realizing the encoding as shown in FIG. 15.

As illustrated in FIG. 19, when the GOP consists of 16 frames, since 16 frames cannot be divided by three frames completely, the frame structure varies in each GOP. Namely, in the next GOP, in the fourth frame, the Top Field includes the high resolution added images ( ) and the Bottom Field includes the left-eye images (○), differently from the current GOP indicated in FIG. 19.

When the frame structure varies in every GOP as mentioned above, in the first GOP, the I picture consists of the left-eye image (○) in the Top Field and the right-eye image (X) in the Bottom Field, in the second GOP, the I picture consists of the high resolution added image (●) in the Top Field and the left-eye image (○) in the Bottom Field, in the third GOP, the I picture consists of the right-eye image (X) in the Top Field and the high resolution added image (●) in the Bottom Field.

As mentioned above, since the image for forming the I picture varies depending on every GOP, it is characterized by obtaining the uniform quality of three images.

The reference numeral 1906 indicates the relationship between the backward prediction picture and the forward prediction picture by an arrow.

Another embodiment of the invention will be described.

In the encoding, a flag indicating a plane image stream or a stereoscopic image stream is inserted into a record stream encoded and transmitted.

For example, in the MPEG format, PES_private_data of 128 bits is defined in the PES_packet, and the flag may be positioned here. The initial 8 bits (B0 to B7) of 128 bits are regarded as the stereoscopic image ID and the identification data of "01011010" is positioned, and then, in the next two bits (B8, B9), the plane stereoscopic flag may be set as below:

00: usual plane image,

01: stereoscopic image,

10: reservation, and

11: reservation.

In the decoding, by detecting the plane stereoscopic flag, that the data is of the plane image stream or the stereoscopic image stream is detected and it is decoded as the plane image or the stereoscopic image and post-processed.

This will be described according to FIG. 1.

In the encoding, in the case of the plane image, the stereoscopic image pre-processor 103 is bypassed, and in the case of the stereoscopic image (left-eye image and right-eye image), after passing through the stereoscopic image pre-processor 103, the data is encoded by the MPEG encoding unit 106, and "00" in the former case or "01" in the later case is written into the initial two bits (plane stereoscopic flag) of the PES_private_data, and then supplied to the transmitting/recording unit 107.

In the decoding, the data supplied from the receiving/reproducing unit 108 is decoded by the MPEG decoding unit 109 and simultaneously, the initial two bits (plane stereoscopic flag) of the PES_private_data is detected. At this time, when it is "00", the stereoscopic image post-processor 110 is bypassed and the plane image is output, while when it is "01", the stereoscopic image (the left-eye image and the right-eye image) is output via the stereoscopic image post-processor 110.

The plane stereoscopic flag may be positioned in the data unit a user can use freely, other than the PES_private_data.

As another example, in the encoding, a flag indicating whether the stream consists of only the plane image, only the stereoscopic image, a combination of the stereoscopic image and the plane image, a combination of the stereoscopic image and the high resolution plane image, or a combination of the stereoscopic image and the high resolution added image is inserted into the record steam encoded and transmitted.

For example, it may be positioned in the PES_private_data in the PES_packet. In the four bits (B8 to B11) later than the stereoscopic image ID, of 128 bits, the plane stereoscopic resolution flag may be set as below:

0000: usual plane image,

0001: only the stereoscopic image,

0010: the stereoscopic image and the usual plane image,

0011: the stereoscopic image and the high resolution plane image,

0100: the stereoscopic image and the high resolution added image, and 0101-1111: reservation.

In the decoding, by detecting the plane stereoscopic resolution flag, which image is included in the stream is detected; of only the plane image, only the stereoscopic image, the stereoscopic image and plane image, the stereoscopic image and high resolution plane image, and the stereoscopic image and high resolution plane added image, and according to the detected result, the data is decoded and post-processed.

The case of the stereoscopic image and high resolution plane added image will be described according to FIG. 2.

In the encoding, in the case of the plane image, the stereoscopic image pre-processor 204 is bypassed, and in the case of the stereoscopic image including the high resolution added image (the left-eye image, the right-eye image, and the high resolution added image), the data is encoded by the MPEG encoding unit 208 after passing through the stereoscopic image pre-processor 204, and the prescribed data is written into the initial three bits (plane stereoscopic resolution flag) of the PES_private_data and supplied to the transmitting/recording unit 209.

In the decoding, the data supplied from the receiving/reproducing unit 210 is decoded by the MPEG decoding unit 211 and the initial three bits (plane stereoscopic resolution flag) of the PES_private_data is detected. At this time, when it is "000", the stereoscopic image post-processor 212 is bypassed and the plane image is output, while when it is other than "000", the stereoscopic image including the high resolution added image (the left-eye image, the right-eye image, and the high resolution added image) is output via the stereoscopic image post-processor 212.

The plane stereoscopic resolution flag may be positioned in the data unit a user can freely use, other than the PES_private_data.

Further, as another example, in the encoding, a flag indicating the multiplexing method of the stereoscopic image may be inserted into the record stream encoded and transmitted.

For example, it may be positioned in the PES_private_data in the PES_packet. In the four bits (B12 to B15) after the stereoscopic image ID and the plane stereoscopic resolution flag, of 128 bits, a stereoscopic multiplexing method flag may be set as below:

0000: reservation,

0001: the left-eye images are arranged in the odd lines and the right-eye images are arranged in the even lines, or the right-eye images are arranged in the odd lines and the left-eye images are arranged in the even lines, and one image is defined as an interlace image, 0010: ones of the left-eye images, the right-eye images, and the high resolution added images are collectively positioned in one portion of one image, the other ones are collectively positioned in the other portion of one image, and further the other ones are collectively positioned in further the other portion of one image, 0011: the left-eye images and the high resolution added images for left-eye are multiplexed so to form a first image and the right-eye images and the dummy images are multiplexed so to form a second image, or the right-eye images and the high resolution added images for right-eye are multiplexed so to form a first image and the left-eye images and the dummy images are multiplexed so to form a second image, and further, the first image is combined with the second image so to form a third interlace image, 0100: ones of the left-eye images, the right-eye images, and the high resolution added images are arranged in the odd lines of the (3n+1)th frame and the evens line of the (3n+2)th frame (n is the integer of 0 and more), the other ones are arranged in the even lines of the (3n+1)th frame and the odd lines of the (3n+3)th frame, and further the other ones are arranged in the odd lines of the (3n+2)th frame and the even lines of the (3n+3)th frame, and the images arranged in the odd lines and the images arranged in the even lines of the same frame are defined as the interlace images, and 0101 to 1111: reservation.

In the decoding, by detecting the stereoscopic encoding method flag, the method of multiplexing the stream is detected, and according to the detected result, it is decoded and post-processed.

The above mentioned stereoscopic multiplexing method flag may include the data indicating whether the high resolution plane image or the high resolution added image corresponds to the left-eye image or the right-eye image, which data is arranged in the odd field and the even field in the case of the interlace image, a method of arranging the continuous data, and a method of forming the dummy data.

For example, it may be positioned in the PES_private_data in the PES_packet. In the 16 bits (B12 to B27) after the stereoscopic image ID and the plane stereoscopic resolution flag, of 128 bits, the initial four bits (B12 to B15) is defined as a flag indicating the above-mentioned multiplexing method of the stereoscopic image.

The next two bits (B16, B17) are set as a left and right flag for high resolution added image.

The high resolution added image left and right flag is set as below:

00: the high resolution added image corresponds to the left-eye image,

01: the high resolution added image corresponds to the right-eye image,

10: the high resolution added image corresponds to both the left-eye image and the right-eye image, and 11: reservation.

The next two bits (B18, B19) are defined as an interlace structure flag.

The interlace structure flag is set as below:

00: the left-eye image corresponds to the Top Field and the right-eye image corresponds to the Bottom Field, the existence of the high resolution added image corresponds to the Top Field and the existence of the dummy image corresponds to the Bottom Field, 01: the right-eye image corresponds to the Top Field and the left-eye image corresponds to the Bottom Field, the existence of the dummy image corresponds to the Top Field and the existence of the high resolution added image corresponds to the Bottom Field, and 10, 11: reservation.

The next five bits (B20 to B24) are defined as a continuous data arrangement flag.

The continuous data arrangement flag is set as below:

00000: from the left to the right, the left-eye image and the right-eye image, or the left-eye image, the right-eye image, and the high resolution added image, 00001: from the left to the right, the right-eye image and the left-eye image, or the left-eye image, the high resolution added image, and the right-eye image, 00010: from the left to the right, the right-eye image, the left-eye image, and the high resolution added image, 00011: from the left to the right, the right-eye image, the high resolution added image, and the left-eye image, 00100: from the left to the right, the high resolution added image, the left-eye image, and the right-eye image, 00101: from the left to the right, the high resolution added image, the right-eye image, and the left-eye image, 00110, 00111: reservation, 01000: from the top to the bottom, the left-eye image and the right-eye image, or the left-eye image, the right-eye image, and the high resolution added image, 01001: from the top to the bottom, the right-eye image and the left-eye image,
or the left-eye image, the high resolution added image, and the right-eye image 01010: from the top to the bottom, the right-eye image, the left-eye image, and the high resolution added image, 01011: from the top to the bottom, the right-eye image, the high resolution added image, and the left-eye image, 01100: from the top to the bottom, the high resolution added image, the left-eye image, and the right-eye image, 01101: from the top to the bottom, the high resolution added image, the right-eye image, the left-eye image, 01110, 01111: reservation, 10000: from the left to the right, the left-eye image, the high resolution added image, and the right-eye image, 10001: from the left to the right, the right-eye image, the left-eye image, and the high resolution added image, 10010: from the left to the right, the right-eye image, the high resolution added image, and the left-eye image, 10011: from the left to the right, the left-eye image, the right-eye image, and the high resolution added image, and 10100 to 11111: reservation.

The next three bits (B25 to B27) are defined as a dummy data structure flag.

The dummy data structure flag is set as below:

000: the dummy data is arranged in the even column and "0" is inserted,

001: the dummy data is arranged in the odd column and "0" is inserted,

010: the dummy data is arranged in the even column and the left pixel is interpolated, 011: the dummy data is arranged in the odd column and the right pixel is interpolated, 100: the dummy data is arranged in the even column, the average value of the left and the right pixels is interpolated, and "0" is inserted into the rightmost column, 101: the dummy data is arranged in the odd column, the average value of the left and the right pixels is interpolated, and "0" is inserted in the leftmost column, 110: the dummy data is arranged in the even column, the average value of the left and the right pixels is interpolated, and the left pixel is interpolated in the rightmost column, and 111: the dummy data is arranged in the odd column, the average value of the left and the right pixels is interpolated, and the right pixel is interpolated in the leftmost column.

As mentioned above, although the arrangement of the flag has been described, the position of the bit and the number of the bits are not restricted to the above example.

Further, also the flag arrangement sequence is not restricted to the above.

As mentioned above, the invention has a effect enabling an efficient encoding of the left-eye images, the right-eye images, and the high resolution added images, by using the respective correlation.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A stereoscopic image encoding and decoding device, comprising
a stereoscopic image encoding device and a stereoscopic image decoding device, wherein
said stereoscopic image encoding device includes
a stereoscopic image pre-processor for multiplexing left-eye images, right-eye images, and high resolution added images for turning the left-eye images or the right-eye images to images of high resolution and forming one image, and
an image encoding unit for encoding said one image processed by the stereoscopic image pre-processor, while
said stereoscopic image decoding device includes
an image decoding unit for decoding said one image encoded by the image encoding unit, a stereoscopic image post-processor for separating said one image decoded by the image decoding unit into the left-eye images, the right-eye images, and the high resolution added images for turning the left-eye images or the right-eye images to the images of high resolution and
wherein ones of the left-eye images, the right-eye images, and the high resolution added images, are arranged in two of the odd lines of the (3n+1)th frame (n is an integer of 0 and more), the even lines of the (3n+1)th frame, the odd lines of the (3n+2)th frame, the even lines of the (3n+2)th frame, the odd lines of the (3n+3)th frame, and the even lines of the (3n+3)th frame,
the other ones are arranged in the other two of the odd lines of the (3n+1)th frame, the even lines of the (3n+1)th frame, the odd lines of the (3n+2)th frame, the even lines of the (3n+2)th frame, the odd lines of the (3n+3)th frame, and the even lines of the (3n+3)th frame,
further the other ones are arranged in the remaining two lines out of the odd lines of the (3n+1)th frame, the even lines of the (3n+1)th frame, the odd lines of the (3n+2)th frame, the even lines of the (3n+2)th frame, the odd lines of the (3n+3)th frame, and the even lines of the (3n+3)th frame and
the images arranged in the odd lines and the even lines of the same frame are defined as interlace images.

2. The stereoscopic image encoding and decoding device as set forth in claim 1, wherein
ones of the left-eye images, the right-eye images, and the high resolution added images are arranged in a left ⅓ portion of one image, the other ones are arranged in a middle portion of said one image, and further the other ones are arranged in a right ⅓ portion of said one image.

3. The stereoscopic image encoding and decoding device as set forth in claim 1, wherein
ones of the left-eye images, the right-eye images, and the high resolution added images are arranged in a top ⅓ portion of one image, the other ones are arranged in a middle portion of said one image, and further the other ones are arranged in a bottom ⅓ portion of said one image.

4. The stereoscopic image encoding and decoding device as set forth in claim 1, wherein
when the images of high resolution are the left-eye images, ones of the right-eye images and the images of high resolution formed by the left-eye images and the high resolution added images for turning the left-eye images to the high resolution images, are arranged in the left ⅓ to ⅔ portion of one image and the other ones are arranged in the right ⅓ to ⅔ portion of said one image,
when the images of high resolution are the right-eye images, ones of the left-eye images and the images of high resolution formed by the right-eye images and the high resolution added images for turning the right-eye images to the high resolution images, are arranged in the left ⅓ to ⅔ portion of one image and the other ones are arranged in the right ⅓ to ⅔ portion of said one image.

5. The stereoscopic image encoding and decoding device as set forth in claim 1 wherein ones of the left-eye images, the right-eye images, and the high resolution added images are arranged in the odd lines of the (3n+1)th frame and the even lines of the (3n+2)th frame (n is an integer of 0 and more), the other ones are arranged in the even lines of the 3n+1)th frame and the odd lines of the(3n+3)th frame, and further the other ones are arranged in the odd lines of the (3n+2)th frame and the even lines of the (3n+3)th frame, and the images arranged in the odd lines and the images arranged in the even lines of the same frame are defined as interlace images.

\* \* \* \* \*